United States Patent
Yagi

(10) Patent No.: US 11,365,299 B2
(45) Date of Patent: Jun. 21, 2022

(54) PROCESS FOR PRODUCING LAMINATE, AND LAMINATE

(71) Applicant: AGC Inc., Chiyoda-ku (JP)

(72) Inventor: Keisuke Yagi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 142 days.

(21) Appl. No.: 16/822,170

(22) Filed: Mar. 18, 2020

(65) Prior Publication Data
US 2020/0216625 A1 Jul. 9, 2020

Related U.S. Application Data

(63) Continuation of application No. PCT/JP2018/037273, filed on Oct. 4, 2018.

(30) Foreign Application Priority Data

Oct. 5, 2017 (JP) .............................. JP2017-195394

(51) Int. Cl.
| | | |
|---|---|---|
| *C08J 5/18* | (2006.01) | |
| *B32B 25/04* | (2006.01) | |
| *B32B 25/14* | (2006.01) | |
| *B32B 37/14* | (2006.01) | |
| *C08J 3/24* | (2006.01) | |
| *C08L 9/02* | (2006.01) | |
| *C08L 23/08* | (2006.01) | |
| *C08L 23/16* | (2006.01) | |
| *C08L 27/18* | (2006.01) | |
| *C08L 33/06* | (2006.01) | |
| *C08L 83/04* | (2006.01) | |

(52) U.S. Cl.
CPC .............. *C08J 5/18* (2013.01); *B32B 25/042* (2013.01); *B32B 25/14* (2013.01); *B32B 37/14* (2013.01); *C08J 3/245* (2013.01); *C08L 9/02* (2013.01); *C08L 23/0869* (2013.01); *C08L 23/16* (2013.01); *C08L 27/18* (2013.01); *C08L 33/062* (2013.01); *C08L 83/04* (2013.01); *B32B 2319/00* (2013.01); *B32B 2597/00* (2013.01); *C08J 2309/02* (2013.01); *C08J 2323/08* (2013.01); *C08J 2323/16* (2013.01); *C08J 2327/18* (2013.01); *C08J 2333/06* (2013.01); *C08J 2383/04* (2013.01); *C08J 2409/02* (2013.01); *C08J 2423/08* (2013.01); *C08J 2423/16* (2013.01); *C08J 2427/18* (2013.01); *C08J 2433/06* (2013.01); *C08J 2483/04* (2013.01); *C08L 2312/00* (2013.01)

(58) Field of Classification Search
CPC ...... C08J 5/18; C08J 2327/18; C08J 2427/18; C08J 2323/08; C08J 2423/08; C08J 2333/06; C08J 2433/06; C08J 2309/02; C08J 2409/02; C08J 2383/04; C08J 2483/04; C08J 2323/16; C08J 2423/16; C08J 2312/00; C08J 3/245; B32B 2319/00; B32B 25/042; B32B 25/14; B32B 37/14; B32B 2597/00; C08L 27/18; C08L 23/0869; C08L 33/062; C08L 9/02; C08L 83/04; C08L 23/16
See application file for complete search history.

(56) References Cited

U.S. PATENT DOCUMENTS

2017/0043560 A1* 2/2017 Kuwajima .............. B32B 25/08

FOREIGN PATENT DOCUMENTS

| JP | 05-320453 A | 12/1993 |
|---|---|---|
| JP | 2010-234777 A | 10/2010 |
| JP | 2011-116004 A | 6/2011 |
| WO | WO 2013/161800 A1 | 10/2013 |
| WO | WO 2015/163212 A1 | 10/2015 |

OTHER PUBLICATIONS

International Search Report dated Jan. 15, 2019 in PCT/JP2018/037273 filed on Oct. 4, 2018, 2 pages.

* cited by examiner

*Primary Examiner* — Hui H Chin
(74) *Attorney, Agent, or Firm* — Oblon, McClelland, Maier & Neustadt, L.L.P.

(57) ABSTRACT

To provide a laminate excellent in alkali resistance and interlaminar strength at high temperature, and a process for producing the laminate. A process for producing a laminate, comprising producing a non-crosslinked laminate having a layer of a first composition containing a copolymer having fluorine atoms and a layer of a second composition containing a non-fluorinated elastic polymer, and crosslinking the first composition and the second composition to produce a laminate having a first layer formed of a crosslinked product of the first composition and a second layer formed of a crosslinked product of the second composition, wherein when the first composition and the second composition contains a common crosslinking aid, the absolute value of the crosslinking rate difference between the first composition and the second composition is at most 0.30.

14 Claims, No Drawings

PROCESS FOR PRODUCING LAMINATE, AND LAMINATE

This application is a continuation of PCT Application No. PCT/JP2018/037273, filed on Oct. 4, 2018, which is based upon and claims the benefit of priority from Japanese Patent Application No. 2017-195394 filed on Oct. 5, 2017. The contents of those applications are incorporated herein by reference in their entireties.

TECHNICAL FIELD

The present invention relates to a process for producing a laminate, and a laminate.

BACKGROUND ART

Fluororubbers are excellent in heat resistance, chemical resistance, oil resistance, weather resistance, etc., and are thereby suitable for application in severe environment to which general purpose rubbers cannot be applicable.

As fluororubbers, for example, a crosslinked product of a copolymer having units based on vinylidene fluoride and units based on hexafluoropropylene (FKM), a crosslinked product of a copolymer having units based on tetrafluoroethylene and units based on propylene (FEPM) and a crosslinked product of a copolymer having units based on tetrafluoroethylene and units based on a perfluoro(alkyl vinyl ether) (FFKM) have been known.

In general, since fluororubbers are expensive, a laminate having a fluororubber and a non-fluororubber laminated has been proposed (Patent Document 1). Patent Document 1 discloses a rubber laminate having a vulcanizable rubber composition comprising a fluororubber and a quaternary ammonium salt derivative of triazine thiol, and a vulcanizable rubber composition other than a fluororubber bonded by vulcanization.

PRIOR ART DOCUMENTS

Patent Document

Patent Document 1: JP-A-H05-320453

DISCLOSURE OF INVENTION

Technical Problem

However, the rubber laminate disclosed in Examples of Patent document 1 is a rubber laminate of FKM and a rubber other than a fluororubber and is insufficient in alkali resistance. Accordingly, the rubber laminate disclosed in Examples of Patent Document 1 is not suitable in strongly alkaline use environment, for example, as a fuel rubber hose for automobiles.

In general, fluororubbers such as FEPM and FFKM are excellent in alkali resistance. However, the present inventor has found that in a laminate having FEPM or FFKM and a non-fluororubber laminated for the purpose of improving alkali resistance, adhesion between the layers, that is, interlaminar strength decreases, and peeling at an interface between the layers may sometimes occur at high temperature of about 150° C.

The present invention provides a laminate excellent in alkali resistance and interlaminar strength at high temperature, and a process for producing a laminate excellent in alkali resistance and interlaminar strength at high temperature.

Solution to Problem

The present invention provides the following constructions.

[1] A process for producing a laminate, comprising
producing a non-crosslinked laminate having a layer of a first composition containing a fluorinated elastic polymer comprising a copolymer having units based on tetrafluoroethylene and units based on propylene or a copolymer having units based on tetrafluoroethylene and units based on a perfluoro(alkyl vinyl ether), a crosslinking agent and a crosslinking aid, and a layer of a second composition containing a non-fluorinated elastic polymer and a crosslinking agent and optionally a crosslinking aid, and
crosslinking the first composition and the second composition to produce a laminate having a first layer formed of a crosslinked product of the first composition and a second layer formed of a crosslinked product of the second composition,
wherein the absolute value of the crosslinking rate difference between the first composition and the second composition as calculated in accordance with the following formula 1 is at most 0.30:

$$\text{crosslinking rate difference} = [1/(t_{90A}-t_{2A})-1/(t_{90B}-t_{2B})] \times (t_{90A}-t_{90B}) \quad \text{formula 1}$$

wherein $t_{2A}$ is a time required until the torque of the first composition starts increasing from the minimum torque, $t_{90A}$ is a time required until the torque of the first composition reaches 90% of the maximum torque, $t_{2B}$ is a time required until the torque of the second composition starts increasing from the minimum torque, and $t_{90B}$ is a time required until the torque of the second composition reaches 90% of the maximum torque, when a crosslinking test is carried out by a viscoelasticity measuring machine (RPA).

[2] The process for producing a laminate according to [1], wherein the first composition and the second composition contain a common crosslinking aid.

[3] The process for producing a laminate according to [2], wherein the absolute value of the crosslinking rate difference is at most 0.05.

[4] The process for producing a laminate according to [1], wherein the first composition and the second composition do not contain a common crosslinking aid, and the absolute value of the crosslinking rate difference is at most 0.02.

[5] The process for producing a laminate according to [4], wherein the absolute value of the crosslinking rate difference is at most 0.01.

[6] The process for producing a laminate according to any one of [1] to [5], wherein the absolute value of the difference between $t_{2A}$ and $t_{2B}$ is from 0 to 1.0 [min].

[7] The process for producing a laminate according to any one of [1] to [6], wherein the absolute value of the difference between the SP value of the fluorinated elastic polymer contained in the first composition and the SP value of the non-fluorinated elastic polymer contained in the second composition, as calculated in accordance with the following formula 2, is from 0 to 3.0 $[\text{cal/cm}^3]^{1/2}$:

$$SP\ \text{value} = (\Delta E/V)^{1/2} \quad \text{formula 2}$$

wherein $\Delta$ is the molar volume of the solvent, and $\Delta E$ is the cohesive energy (energy of latent heat of vaporization).

[8] The process for producing a laminate according to any one of [1] to [7], wherein the degree of crosslinking of the first composition is from 5 to 150, and the degree of crosslinking of the second composition is from 5 to 300, as calculated in accordance with the following formula 3:

$$\text{degree of crosslinking}=MH-ML \quad \text{formula 3}$$

wherein MH is the maximum torque, and ML is the minimum torque, when a crosslinking test is carried out by a crosslinking property measuring machine (RPA).

[9] The process for producing a laminate according to any one of [1] to [8], wherein the Mooney viscosity of the fluorinated elastic polymer contained in the first composition is from 10 to 300, and the Mooney viscosity of the non-fluorinated elastic polymer contained in the second composition is from 5 to 120.

[10] The process for producing a laminate according to any one of [1] to [9], wherein at least one of the first composition and the second composition contains an antioxidant.

[11] The process for producing a laminate according to any one of [1] to [10], wherein the crosslinking agent in the first composition and the crosslinking agent in the second composition are both organic peroxides.

[12] A laminate comprising a first layer formed of a crosslinked product of a first composition containing a fluorinated elastic polymer comprising a copolymer having units based on tetrafluoroethylene and units based on propylene or a copolymer having units based on tetrafluoroethylene and units based on a perfluoro(alkyl vinyl ether), a crosslinking agent and a crosslinking aid, and a second layer formed of a crosslinked product of a second composition containing a non-fluorinated elastic polymer and a crosslinking agent and optionally a crosslinking aid, wherein the first layer or the second layer undergoes material failure when T-peel test as specified in JIS K6854-3:1999 is carried out at a temperature of from 100 to 200° C.

[13] A laminated rubber hose, produced by using a laminate produced by the process for producing a laminate as defined in any one of [1] to [11] or the laminate as defined in [12].

[14] A laminated rubber roll, produced by using a laminate produced by the process for producing a laminate as defined in any one of [1] to [11] or the laminate as defined in [12].

Advantageous Effects of Invention

According to the present invention, a laminate excellent in alkali resistance and interlaminar strength at high temperature can be obtained.

DESCRIPTION OF EMBODIMENTS

Meanings of the following terms in this specification are as follows.

A "monomer" means a compound having a polymerizable unsaturated bond. The polymerizable unsaturated bond may, for example, be a double bond or a triple bond between carbon atoms.

"Units based on a monomer" generally means an atomic group directly formed by polymerization of one monomer molecule, and an atomic group obtained by chemical conversion of part of the atomic group. The "units based on a monomer" may be referred to also as "monomer units". Units based on a specific monomer may sometimes be denoted by a specific monomer name or abbreviated name with "units". For example, tetrafluoroethylene is abbreviated as "TFE", and units based on tetrafluoroethylene may be referred to as "TFE units".

The "elastic shear modulus G'" is a value measured in accordance with ASTM D5289 and D6204, at a temperature of 100° C. at an amplitude of 0.5° at a frequency of 50/min.

An "etheric oxygen atom" is one oxygen atom present between carbon-carbon atoms.

<Laminate>

The laminate of the present invention has a first layer formed of a crosslinked product of a first composition containing a fluorinated elastic polymer comprising a copolymer having units based on tetrafluoroethylene (hereinafter sometimes referred to as TFE) and units based on propylene (hereinafter sometimes referred to as copolymer 1) or a copolymer having TFE units and units based on a perfluoro (alkyl vinyl ether) (hereinafter sometimes referred to as PAVE) (hereinafter sometimes referred to as copolymer 2) as described hereinafter, and a second layer formed of a crosslinked product of a second composition containing a non-fluorinated elastic polymer as described hereinafter.

When the laminate of the present invention is subjected to T-peel test as specified in JIS K6854-3:1999 at a temperature of from 100 to 200° C., the first layer or the second layer undergoes material failure.

Details of the process for producing a laminate of the present invention will be described hereinafter.

The laminate of the present invention is preferably a two-layer structure laminate of a first layer formed of a crosslinked product of the first composition and a second layer formed of a crosslinked product of the second composition, but is not limited thereto. The laminate of the present invention may have a layer other than the first layer and the second layer. Other layer may, for example, be an adhesive thin layer present between the two layers, a layer comprising a thermoplastic resin or a metal thin film, described hereinafter. Further, the laminate of the present invention may have a plurality of first layers or a plurality of second layers.

The thicknesses of the first layer formed of a crosslinked product of the first composition and the second layer formed of a crosslinked product of the second composition in the laminate of the present invention are not particularly limited.

For example, in a case where the laminate of the present invention is used as a laminated rubber hose for automobiles, the thickness of the first layer formed of a crosslinked product of the first composition is preferably from 0.1 to 100 mm, more preferably from 0.15 to 50 mm, particularly preferably from 0.2 to 30 mm. The thickness of the second layer formed of a crosslinked product of the second composition is preferably from 0.1 to 100 mm, more preferably from 0.15 to 50 mm, particularly preferably from 0.2 to 30 mm.

For example, in a case where the laminate of the present invention is used as a laminated rubber hose for plant, the thickness of the first layer formed of a crosslinked product of the first composition is preferably from 0.2 to 200 mm, more preferably from 0.2 to 100 mm, particularly preferably from 0.2 to 20 mm. The thickness of the second layer formed of a crosslinked product of the second composition is preferably from 0.2 to 200 mm, more preferably from 0.2 to 100 mm, particularly preferably from 0.2 to 50 mm.

For example, in a case where the laminate of the present invention is used as an industrial laminated rubber role, the thickness of the first layer formed of a crosslinked product of the first composition is preferably from 0.2 to 20,000 mm, more preferably from 0.15 to 10,000 mm, particularly preferably from 0.2 to 1,000 mm. The thickness of the second layer formed of a crosslinked product of the second composition is preferably from 0.1 to 20,000 mm, more preferably from 0.15 to 10,000 mm, particularly preferably from 0.1 to 1,000 mm.

In the laminate of the present invention, the proportion of the thickness of the first layer to the total thickness of the first layer and the second layer is preferably from 10 to 90%, more preferably from 25 to 75%.

(Mechanism of Action)

The laminate of the present invention, which comprises the first layer formed of a crosslinked product of the first composition containing the copolymer 1 or the copolymer 2, is excellent in alkali resistance.

Further, when the laminate of the present invention is subjected to T-peel test as specified in JIS K6854-3:1999 at a temperature of from 100 to 200° C., peeling at the interface of the first layer or the second layer does not occur but material failure occurs, and thus the laminate of the present invention is excellent in interlaminar strength at high temperature.

<Process for Producing Laminate>

The process for producing the laminate of the present invention is a process comprising producing a non-crosslinked laminate having a layer of a first composition as described hereinafter and a layer of a second composition as described hereinafter, and crosslinking the first composition and the second composition to produce a laminate having a first layer and a second layer. The first layer is formed of a crosslinked product of the first composition, and the second layer is formed of a crosslinked product of the second composition.

In the process for producing the laminate of the present invention, the first composition contains a fluorinated elastic polymer comprising the copolymer 1 or the copolymer 2, a crosslinking agent and a crosslinking aid, and the second composition contains a non-fluorinated elastic polymer and a crosslinking agent and optionally a crosslinking aid.

Further, the absolute value of the crosslinking rate difference between the first composition and the second composition as calculated in accordance with the following formula 1 is at most 0.30:

$$\text{crosslinking rate difference} = [1/(t_{90A}-t_{2A})-1/(t_{90B}-t_{2B})] \times (t_{90A}-t_{90B}) \quad \text{formula 1}$$

wherein $t_{2A}$ is a time required until the torque of the first composition reaches the minimum torque, $t_{90A}$ is a time required until the torque of the first composition reaches 90% of the maximum torque, $t_{2B}$ is a time required until the torque of the second composition reaches the minimum torque, and $t_{90B}$ is a time required until the torque of the second composition reaches 90% of the maximum torque, based on the test start time, when a crosslinking test is carried out by a viscoelasticity measuring machine (manufactured by ALPHA TECHNOLOGIES, RPA-2000).

(Crosslinking Rate Difference)

The absolute value of the crosslinking rate difference between the first composition and the second composition is at most 0.30, preferably at most 0.10, more preferably at most 0.05, further preferably at most 0.01. The lower limit value of the absolute value of the crosslinking rate difference is 0.

When the absolute value of the crosslinking rate difference between the first composition and the second composition is at most 0.30, the first composition and the second composition undergo crosslinking at rates close to each other, and it is considered that the first layer and the second layer are likely to form a primary bond, and thus the laminate obtained by the production process of the present invention is excellent in interlaminar strength at high temperature.

(Crosslinking Start Time)

In the process for producing the laminate of the present invention, the absolute value of the difference between $t_{2A}$ and $t_{2B}$ is preferably from 0 to 1.0 [min], more preferably from 0 to 0.6 [min], further preferably from 0 to 0.4 [min], most preferably from 0 to 0.2 [min].

$t_{2A}$ is a time which may be considered as the crosslinking start time of the first composition, and $t_{2B}$ is a time which may be considered as the crosslinking start time of the second composition, and thus the absolute value of the difference between $t_{2A}$ and $t_{2B}$ may be considered as the difference in the crosslinking start time between the first composition and the second composition. That is, when the absolute value of the difference between $t_{2A}$ and $t_{2B}$ is within a range of from 0 to 1.0 [min], it is considered that the crosslinking start times of the first composition and the second composition are close to each other, and it is less likely that crosslinking of one composition proceeds first. Thus, it is considered that the first layer and the second layer are likely to form a primary bonding, and the laminate is more excellent in interlaminar strength between the first layer and the second layer at high temperature.

In the process for producing the laminate of the present invention, the means to adjust the absolute value of the crosslinking rate difference as calculated in accordance with the formula 1 and the absolute value of the difference between $t_{2A}$ and $t_{2B}$ to be within predetermined ranges is not particularly limited. As a specific means, the types and the contents of the crosslinking aids in the first composition and the second composition are properly adjusted, or the antioxidant is contained in at least one of the first composition and the second composition. Otherwise, the types and the contents of the crosslinking agents or other additives in the first composition and the second composition may properly be adjusted.

As a preferred production process to obtain a laminate which is more excellent in interlaminar strength between the first layer and the second layer at high temperature, the following may be mentioned.

(1) Adjustment of crosslinking aid
(2) Adjustment of SP value of polymer
(3) Adjustment of degree of crosslinking of composition
(4) Adjustment of viscosity of polymer (1) Adjustment of Crosslinking Aid In the process for producing the laminate of the present invention, it is preferred that the second composition contains a crosslinking aid, and the first composition and the second composition contain a common the crosslinking aid. When the second composition contains a crosslinking aid, and the first composition and the second composition contain a common crosslinking aid, it is considered that the common crosslinking aid reacts with a common crosslinking agent, and thus the crosslinking reaction at the interface between the first composition and the second composition is likely to proceed.

In a case where the second composition contains a crosslinking aid, and the first composition and the second composition contain a common crosslinking aid, the absolute value of the crosslinking rate difference as calculated in accordance with the formula 1 between the first composition and the second composition is preferably at most 0.05, more preferably at most 0.01.

In a case where the second composition contains a crosslinking aid, and the first composition and the second composition contain a common crosslinking aid, when the absolute value of the crosslinking rate difference between the first composition and the second composition is at most 0.05, the first composition and the second composition undergo crosslinking at rates close to each other, and the first layer and the second layer are likely to form a primary bonding. Further, in a case where the first composition and the second composition contain a common crosslinking agent, it is considered that the common crosslinking aid reacts with the common crosslinking agent, and the crosslinking reaction at the interface between the first composition and the second composition is likely to occur, and accordingly the laminate obtained by the production process of the present invention will be more excellent in interlaminar strength at high temperature.

"Contain a common crosslinking aid" means that in a case where the second composition contains a crosslinking aid, at least one crosslinking aid contained in the first composition is the same compound as at least one crosslinking aid contained in the second composition.

In a case where the first composition and the second composition do not contain a common crosslinking aid, the absolute value of the crosslinking rate difference as calculated in accordance with the formula 1 between the first composition and the second composition is preferably at most 0.010, more preferably at most 0.005, most preferably at most 0.003.

In a case where the first composition and the second composition do not contain a common crosslinking aid, when the absolute value of the crosslinking rate difference between the first composition and the second composition is at most 0.010, it is considered that the first composition and the second composition undergo crosslinking at rates closer to each other, and the first layer and the second layer are likely to form a primary bonding, and accordingly the laminate produced by the production process of the present invention is more excellent in interlaminar strength at high temperature.

Here, "do not contain a common crosslinking aid" means that in a case where the second composition contains a crosslinking aid, all the crosslinking aids contained in the first composition are compounds different from all the crosslinking aids contained in the second composition. A case where the second composition contains no crosslinking aid corresponds to a case where the first composition and the second composition do not contain a common crosslinking aid.

(2) Adjustment of SP Value of Polymer

In the process for producing the laminate of the present invention, the absolute value of the difference between the SP value of the fluorinated elastic polymer contained in the first composition and the SP value of the non-fluorinated elastic polymer contained in the second composition is preferably from 0 to 3.0 $[cal/cm^3]^{1/2}$, more preferably from 0 to 1.5 $[cal/cm^3]^{1/2}$, further preferably from 0 to 0.5 $[cal/cm^3]^{1/2}$. When the absolute value of the difference between the SP value of the fluorinated elastic polymer and the SP value of the non-fluorinated elastic polymer is within a range of from 0 to 3.0 $[cal/cm^3]^{1/2}$, it is considered that the compatibility between the fluorinated elastic polymer and the non-fluorinated elastic polymer tends to be good, and the first layer and the second layer are likely to form a primary bonding, and accordingly the laminate is more excellent in interlaminar strength between the first layer and the second layer.

Here, the SP value is a solubility parameter $\sigma$ $[cal/cm^3]^{1/2}$. The solubility parameter $\sigma$, that is the SP value ($\delta$) is defined as the square root of the cohesive energy density as shown in the following formula 2.

$$\delta=(\Delta E/V)^{1/2} \qquad \text{formula 2}$$

In the formula 2, V is the molar volume of the solvent, $\Delta E$ is the cohesive energy (energy of latent heat of vaporization). The SI unit of the SP value is $[J/cm^3]^{1/2}$ or $[MPa]^{1/2}$, however, in this specification, $[cal/cm^3]^{1/2}$ which has been conventionally used is employed.

(3) Adjustment of Degree of Crosslinking of Composition

In the process for producing the laminate of the present invention, the degree of crosslinking of the first composition is preferably from 5 to 150, more preferably from 10 to 100, further preferably from 20 to 100, most preferably from 40 to 100.

Further, the degree of crosslinking of the second composition is preferably from 5 to 300, more preferably from 10 to 210, further preferably from 30 to 160, most preferably from 50 to 110.

The degree of crosslinking is defined by the following formula 3.

$$\text{Degree of crosslinking}=MH-ML \qquad \text{formula 3}$$

wherein MH is the maximum torque, and ML is the minimum torque, when a crosslinking test is carried out by a viscoelasticity measuring machine (RPA). The degree of crosslinking in this specification is a value measured by a rubber process analyzer (manufactured by ALPHA TECHNOLOGIES, RPA-2000) which is a viscoelasticity measuring machine (RPA).

The degree of crosslinking is an index of the crosslinkability of a crosslinkable composition, and a higher degree of crosslinking means a larger number of crosslinking sites and more excellent crosslinkability. When compositions with high crosslinkability are laminated, the obtainable laminate will be excellent in interlaminar strength.

When the degree of crosslinking of the first composition is at least 5, the first composition is excellent in crosslinkability, whereby a laminate excellent in interlaminar strength will be obtained, and when it is at most 150, processability is excellent.

When the degree of crosslinking of the second composition is at least 5, the second composition is excellent in crosslinkability, whereby a laminate excellent in interlaminar strength will be obtained, and when it is at most 300, processability is excellent.

In the process for producing the laminate of the present invention, the absolute value of the difference between the degree of crosslinking of the first composition and the degree of crosslinking of the second composition is preferably from 0 to 200, more preferably from 0 to 100, further preferably from 0 to 80. When the absolute value of the difference between the degree of crosslinking of the first composition and the degree of crosslinking of the second composition is within a range of from 0 to 200, it is considered that the first layer and the second layer are likely to form a primary bonding, and accordingly the laminate is more excellent in interlaminar strength between the first layer and the second layer.

(4) Adjustment of Viscosity of Polymer

In the process for producing the laminate of the present invention, the Mooney viscosity of the fluorinated elastic polymer contained in the first composition is preferably from 10 to 300, more preferably from 30 to 200, further preferably from 50 to 120.

Further, the Mooney viscosity of the non-fluorinated elastic polymer contained in the second composition is preferably from 5 to 120, more preferably from 10 to 110, further preferably from 20 to 70.

When the Mooney viscosity of the fluorinated elastic polymer contained in the first composition is at least 10, processability is excellent. When the Mooney viscosity is at most 300, it is considered that the fluorinated elastic polymer is likely to be mixed with the non-fluorinated elastic polymer at the interface, and the first layer and the second layer are likely to form a primary bonding, whereby the laminate is excellent in interlaminar strength.

When the Mooney viscosity of the non-fluorinated elastic polymer contained in the second composition is at least 5, processability is excellent. When the Mooney viscosity is at most 120, it is considered that the non-fluorinated elastic polymer is likely to be mixed with the fluorinated elastic polymer at the interface, and the first layer and the second layer are likely to form a primary bonding, whereby the laminate is excellent in interlaminar strength.

The Mooney viscosity of the fluorinated elastic polymer is a value measured by a Mooney viscometer (manufactured by Shimadzu Corporation, SMV-201) in accordance with JIS K6300-1:2013 using a L rotor having a diameter of 38.1 mm and a thickness of 5.54 mm at 100° C. for a preheating time of 1 minute for a rotor revolution time of 4 minutes.

In the process for producing the laminate of the present invention, the absolute value of the difference between the Mooney viscosity of the fluorinated elastic polymer contained in the first composition and the Mooney viscosity of the non-fluorinated elastic polymer contained in the second composition is preferably from 0 to 200, more preferably from 0 to 100, further preferably from 0 to 75. When the absolute value of the difference between the Mooney viscosity of the fluorinated elastic polymer contained in the first composition and the Mooney viscosity of the non-fluorinated elastic polymer contained in the second composition is within a range of from 0 to 200, it is considered that the fluorinated elastic polymer and the non-fluorinated elastic polymer are likely to be mixed with each other at the interface, and the first layer and the second layer are likely to form a primary bonding, and accordingly the laminate is more excellent in interlaminar strength between the first layer and the second layer.

(First Composition)

The first composition contains the fluorinated elastic polymer comprising the copolymer 1 or the copolymer 2, the crosslinking agent and the crosslinking aid. The first composition may contain other components within a range not to impair the effects of the present invention.

A crosslinked product of the first composition is excellent in alkali resistance and steam resistance as compared with a crosslinked product of a copolymer having units based on hexafluoropropylene (hereinafter sometimes referred to as HFP) and units based on vinylidene fluoride (hereinafter sometimes referred to as VdF), that is, FKM.

(Copolymer 1)

The copolymer 1 may further has other monomer units as the case requires within a range not to impair the effects of the present invention.

As other monomer in the copolymer 1, a monomer having at least two polymerizable unsaturated bonds (hereinafter sometimes referred to as DVE), PAVE, or perfluoro (oxaalkyl vinyl ether) (hereinafter sometimes referred to as POAVE) may, for example, be mentioned.

By copolymerizing DVE with TFE and propylene, the copolymer 1 having branches is obtained. When the copolymer 1 further has DVE units, crosslinkability, and mechanical properties of a crosslinked product such as tensile strength and compression set at high temperature will be more excellent.

As the DVE, preferred is at least one member selected from the group consisting of compound 4 represented by the following formula 4, compound 5 represented by the following formula 5 and compound 6 represented by the following formula 6.

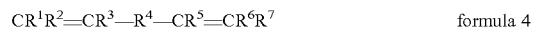

$$CR^1R^2\!\!=\!\!CR^3\!-\!R^4\!-\!CR^5\!\!=\!\!CR^6R^7 \qquad \text{formula 4}$$

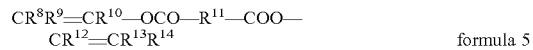

$$CR^8R^9\!\!=\!\!CR^{10}\!-\!OCO\!-\!R^{11}\!-\!COO\!-\!\\CR^{12}\!\!=\!\!CR^{13}R^{14} \qquad \text{formula 5}$$

$$CR^{15}R^{16}\!\!=\!\!CR^{17}COOCH\!\!=\!\!CH_2 \qquad \text{formula 6}$$

wherein $R^1$, $R^2$, $R^3$, $R^5$, $R^6$, $R^7$, $R^8$, $R^9$, $R^{10}$, $R^{12}$, $R^{13}$, $R^{14}$ and $R^{17}$ are each independently a hydrogen atom, a fluorine atom or a methyl group, $R^4$ and $R^{11}$ are each independently a $C_{1-10}$ alkylene group, a $C_{1-10}$ alkylene group having an etheric oxygen atom, a $C_{1-10}$ fluoroalkylene group, a $C_{1-10}$ fluoroalkylene group having an etheric oxygen atom, or an oxygen atom, and $R^{15}$ and $R^{16}$ are each independently a hydrogen atom, a $C_{1-10}$ alkyl group or a $C_{1-10}$ alkyl group having an etheric oxygen atom.

The compound 4 having an etheric oxygen atom may, for example, be divinyl ether, allyl vinyl ether, butenyl vinyl ether, fluoro(divinyl ether), fluoro(allyl vinyl ether) or fluoro (butenyl vinyl ether).

In the compound 4, with a view to increasing crosslinkability and heat resistance, it is preferred that $R^1$, $R^2$, $R^3$, $R^5$, $R^6$ and $R^7$ are each independently a fluorine atom or a hydrogen atom, and it is more preferred that all of $R^1$, $R^2$, $R^3$, $R^5$, $R^6$ and $R^7$ are fluorine atoms.

In a case where $R^4$ is not an oxygen atom, the alkylene group or the fluoroalkylene group as $R^4$ may be linear or branched. However, the alkylene group or the fluoroalkylene group as $R^4$ is preferably linear. The number of carbon atoms in $R^4$ is preferably from 2 to 8, more preferably from 3 to 7, further preferably from 3 to 6, particularly preferably from 3 to 5. The number of the etheric oxygen atom in $R^4$ is preferably from 0 to 3, more preferably from 1 to 2. When $R^4$ is in such a preferred embodiment, mechanical properties of a crosslinked product such as tensile strength and compression set at high temperature will be more excellent.

$R^4$ is, in view of heat resistance and with a view to suppressing coloring of the polymer, preferably a fluoroalkylene group having oxygen atoms at both terminals or having no oxygen atom, and such a fluoroalkylene group is more preferably a perfluoroalkylene group.

As specific examples of a preferred compound 4, 1,4-butanediol divinyl ether, $CF_2\!\!=\!\!CFO(CF_2)_3OCF\!\!=\!\!CF_2$ (hereinafter sometimes referred to as C3DVE), $CF_2\!\!=\!\!CFO(CF_2)_4OCF\!\!=\!\!CF_2$ (hereinafter sometimes referred to as C4DVE) and $CH_2\!\!=\!\!CH(CF_2)_6CH\!\!=\!\!CH_2$ may be mentioned.

The compound 5 may, for example, be divinyl ester, allyl vinyl ester or butenyl vinyl ester.

In the compound 5, it is preferred that $R^8$, $R^9$, $R^{10}$, $R^{12}$, $R^{13}$ and $R^{14}$ are a hydrogen atom.

As $R^{11}$, similar groups to $R^4$ may, for example, be mentioned. A preferred range of the number of carbon atoms is also the same. The number of the etheric oxygen atom in $R^{11}$ is preferably from 0 to 1, more preferably 0.

As a specific example of a preferred compound 5, divinyl adipate may be mentioned.

The compound 6 is preferably a compound wherein $R^{16}$ and $R^{17}$ are a hydrogen atom.

As specific examples of a preferred compound 6, vinyl crotonate and vinyl methacrylate may be mentioned. Among them, the compound 6 is more preferably vinyl crotonate.

DVE may be used alone or in combination of two or more. In a case where the copolymer 1 has units based on DVE, the proportion of the units based on DVE is preferably from 0.01 to 3 mol %, more preferably from 0.01 to 1 mol %, further preferably from 0.01 to 0.5 mol % to the total amount of all units constituting the copolymer 1. When the proportion of the units based on DVE is at least the lower limit value of the above range, the crosslinkability will be excellent, and mechanical properties of a crosslinked product such as tensile strength and compression set at high temperature will be more excellent. When the proportion of the units based on DVE is at most the upper limit value of the above range, while excellent physical properties of a crosslinked product are maintained, breakage when a stress such as bending is applied at high temperature can be securely prevented or can further be reduced.

As PAVE, compound 7 may, for example, be mentioned.

formula 7 wherein $R^{f1}$ is a $C_{1-10}$ perfluoroalkyl group.

The perfluoroalkyl group as $R^{f1}$ may be linear or branched. The number of carbon atoms in the perfluoroalkyl group is preferably from 1 to 8, more preferably from 1 to 6, further preferably from 1 to 5, particularly preferably from 1 to 3.

As specific examples of PAVE, perfluoro(methyl vinyl ether) (hereinafter sometimes referred to as PMVE), perfluoro(ethyl vinyl ether) (hereinafter sometimes referred to as PEVE) or perfluoro(propyl vinyl ether) (hereinafter sometimes referred to as PPVE) may be mentioned. PAVE may be used alone or in combination of two or more. Among them, PMVE is preferred.

In a case where the copolymer 1 has PAVE units, the proportion of the PAVE units is preferably from 3 to 60 mol %, more preferably from 5 to 57 mol %, further preferably from 10 to 40 mol % to the total amount of all units constituting the copolymer 1. When the copolymer 1 has the PAVE units within the above range, it will be more excellent in chemical resistance (e.g. alkali resistance).

As POAVE, compound 8 represented by the formula 8 may, for example, be mentioned.

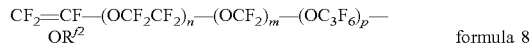

formula 8 wherein $R^{f2}$ is a $C_{1-4}$ perfluoroalkyl group, n is an integer of from 0 to 3, m is an integer of from 0 to 4, p is an integer of from 0 to 4, and n+m+p is an integer of from 1 to 7.

n, m and p respectively represent the numbers of $(OCF_2CF_2)$, $(OCF_2)$ and $(OC_3F_6)$. Accordingly, the formula 8 does not represent the order of dispositions of $(OCF_2CF_2)_n$, $(OCF_2)_m$ and $(OC_3F_6)_p$, and in a case where n, m and p are each at least 2, $(OCF_2CF_2)_n$, $(OCF_2)_m$ and $(OC_3F_6)_p$ do not represent the block disposition of $(OCF_2CF_2)$, $(OCF_2)$ and $(OC_3F_6)$.

The perfluoroalkyl group as $R^{f2}$ may be linear or branched. The number of carbon atoms in $R^{f2}$ is preferably from 1 to 3.

$C_3F_6$ may be linear or branched.

When n is 0, m is preferably 3 or 4.
When n is 1, m is preferably an integer of from 2 to 4.
When n is 2 or 3, m is preferably 0.
n is preferably an integer of from 1 to 3.

When the number of carbon atoms in $R^{f2}$, n and m are within the above ranges, productivity of the copolymer 1 will improve, and rubber properties of a crosslinked product of the first composition at low temperature (hereinafter sometimes referred to as low temperature properties) will be excellent.

As specific examples of the compound 8, the following compounds may be mentioned.

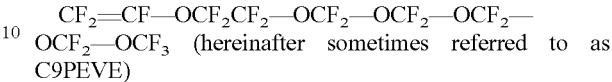

(hereinafter sometimes referred to as C9PEVE)

$CF_2=CF-OCF_2CF_2-OCF_2-OCF_2-OCF_3$ (hereinafter sometimes referred to as C7PEVE)

$CF_2=CF-OCF_2CF_2-OCF_2CF_2-OCF_2CF_3$ (hereinafter sometimes referred to as EEAVE)

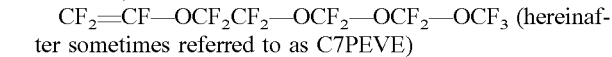

(hereinafter sometimes referred to as EEEAVE)

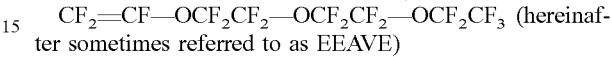

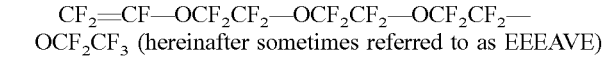

As the compound 8, with a view to improving the productivity of the copolymer 1 and in view of excellent low temperature properties of a crosslinked product of the first composition, C9PEVE, C7PEVE, EEAVE and EEEAVE are preferred.

Such compounds may be produced by the method disclosed in WO00/56694 from corresponding alcohols as raw materials.

Other monomer is not particularly limited so long as it is a compound copolymerizable with TFE and propylene. Specifically, a monomer having a fluorine atom such as HFP, VdF, chlorotrifluoroethylene, vinyl fluoride, pentafluoropropylene, perfluorocyclobutene, ethylene having a perfluoroalkyl group (for example, $CH_2=CHCF_3$, $CH_2=CHCF_2CF_3$, $CH_2=CHCF_2CF_2CF_3$, $CH_2=CHCF_2CF_2CF_2CF_3$ or $CH_2=CHCF_2CF_2CF_2CF_2CF_3$), or a monomer having no fluorine atom such as an α-olefin such as ethylene, isobutylene or pentene, a vinyl ether such as methyl vinyl ether, ethyl vinyl ether, propyl vinyl ether or butyl vinyl ether or a vinyl ester such as vinyl acetate, vinyl propionate, vinyl butyrate, vinyl caproate or vinyl caprylate may, for example, be mentioned.

As other monomer, a monomer having an iodine atom may be used. By copolymerizing a monomer having an iodine atom, iodine atoms are introduced to the side chains of the copolymer 1.

The monomer having an iodine atom may, for example, be iodoethylene, 4-iodo-3,3,4,4-tetrafluoro-1-butene, 2-iodo-1,1,2,2-tetrafluoro-1-vinyloxyethane, 2-iodoethyl vinyl ether, allyl iodide, 1,1,2,3,3,3-hexafluoro-2-iodo-1-(perfluorovinyloxy) propane, 3,3,4,5,5,5-hexafluoro-4-iodopentene, iodotrifluoroethylene or 2-iodoperfluoro(ethyl vinyl ether).

Such other monomer may be used alone or in combination of two or more.

In a case where the copolymer 1 has other monomer units, the proportion of other monomer units is preferably from 0.001 to 10 mol %, more preferably from 0.01 to 3 mol %, further preferably from 0.01 to 1 mol % to the total amount of all units constituting the copolymer 1.

The copolymer 1 preferably further has iodine atoms in view of excellent crosslinkability. The iodine atom is preferably bonded to at least the terminal of the polymer chain of the copolymer 1 in view of crosslinkability. The terminal of the polymer chain means both the terminal of the main chain and the terminal of each branched chain.

The copolymer 1 having iodine atoms may be produced e.g. by a method of copolymerizing a monomer having an iodine atom as other monomer or a method for producing the copolymer 1 by using the after-described chain transfer agent having an iodine atom.

The content of iodine atoms in the copolymer 1 is preferably from 0.01 to 5.0 mass %, more preferably from 0.05 to 2.0 mass %, further preferably from 0.05 to 1.0 mass % to the total mass of the copolymer 1. When the content of iodine atoms is within the above range, the crosslinkability will be more excellent, and mechanical properties of the crosslinked product will be more excellent.

The elastic shear modulus G' of the copolymer 1 is preferably from 50 kPa to 600 kPa, more preferably from 100 kPa to 500 kPa, further preferably from 200 kPa to 400 kPa. A higher elastic shear modulus G' means a higher molecular weight of the polymer and a higher density of entanglement of the polymer chain. When the elastic shear modulus G' of the copolymer 1 is within the above range, mechanical properties of a crosslinked product such as tensile strength will be more excellent.

The copolymer 1 is preferably a copolymer comprising units of any one of the following combinations X1 to X8. Each of such copolymers may be used alone or in combination of two or more.

More preferred is X1, X2, X4, X5, X6 or X8, further preferred is X1, X5 or X8 and particularly preferred is X8, in that the copolymer 1 is excellent in crosslinkability, and further the obtainable crosslinked product is more excellent in mechanical properties, heat resistance, chemical resistance (such as alkali resistance), oil resistance and weather resistance.

X1: combination of TFE units and propylene units (hereinafter sometimes referred to as P units).

X2: combination of TFE units, P units and VdF units.

X3: combination of TFE units, P units and PPVE units.

X4: combination of TFE units, P units and PMVE units.

X5: combination of TFE units, P units and compound 2 units.

X6: combination of TFE units, P units, compound 2 units and VdF units.

X7: combination of TFE units, P units, compound 2 units and PPVE units.

X8: combination of TFE units, P units, compound 2 units and PMVE units.

The molar ratios or proportions of the respective units constituting the copolymers X1 to X8 are preferably within the following ranges. When the molar ratios or proportions of the respective units constituting the copolymers X1 to X8 are within the following ranges, each copolymer will be more excellent in crosslinkability, and the obtainable crosslinked product will be more excellent in mechanical properties, heat resistance, chemical resistance (such as alkali resistance), oil resistance and weather resistance.

X1: the proportion of the TFE units is from 40 to 60 mol % and the proportion of the P units is from 40 to 60 mol %, to the total amount of all units constituting X1.

X2: the proportion of the TFE units is from 40 to 59 mol %, the proportion of the P units is from 40 to 59 mol % and the proportion of the VdF units is from 1 to 10 mol %, to the total amount of all units constituting X2.

X3: the proportion of the TFE units is from 30 to 60 mol %, the proportion of the P units is from 10 to 40 mol % and the proportion of the PPVE units is from 10 to 40 mol %, to the total amount of all units constituting X3.

X4: the proportion of the TFE units is from 30 to 60 mol %, the proportion of the P units is from 10 to 40 mol % and the proportion of the PMVE units is from 10 to 40 mol %, to the total amount of all units constituting X4.

X5: the proportion of the TFE units is from 40 to 59.99 mol %, the proportion of the P units is from 40 to 59.99 mol % and the proportion of the compound 2 units is from 0.01 to 3 mol %, to the total amount of all units constituting X5.

X6: the proportion of the TFE units is from 40 to 58.99 mol %, the proportion of the P units is from 40 to 58.99 mol %, the proportion of the compound 2 units is from 0.01 to 3 mol % and the proportion of the VdF units is from 1 to 10 mol %, to the total amount of all units constituting X6.

X7: the proportion of the TFE units is from 30 to 60 mol %, the proportion of the P units is from 10 to 40 mol %, the proportion of the compound 2 units is from 0.01 to 3 mol % and the proportion of the PPVE units is from 10 to 40 mol %, to the total amount of all units constituting X7.

X8: the proportion of the TFE units is from 30 to 60 mol %, the proportion of the P units is from 10 to 40 mol %, the proportion of the compound 2 units is from 0.01 to 3 mol % and the proportion of the PMVE units is from 10 to 40 mol %, to the total amount of all units constituting X8.

In a case where the copolymer 1 is a bipolymer comprising TFE units and P units, the molar ratio of the TFE units to the P units (TFE units/P units) is preferably from 30/70 to 99/1, more preferably from 30/70 to 70/30, further preferably from 40/60 to 60/40. When the molar ratio of the TFE units to the P units is within the above range, the obtainable crosslinked product will be more excellent in mechanical properties, heat resistance, chemical resistance (such as alkali resistance), oil resistance and weather resistance.

The total of the proportion of the TFE units and the proportion of the P units is preferably at least 99 mol % to the total amount of all units constituting the copolymer 1.

(Copolymer 2)

The PAVE units which the copolymer 2 has are preferably units based on the compound 7.

As $R^{f1}$ in the compound 7, the perfluoroalkyl group may be linear or may be branched. The number of carbon atoms in $R^{f1}$ is preferably from 1 to 5, more preferably from 1 to 3, with a view to improving the productivity of the copolymer 2.

As specific examples of a preferred compound 7, PMVE, PEVE, PPVE and $CF_2=CF-O-CF_2CF_2CF_2CF_3$ may be mentioned.

As the compound 7, with a view to improving the productivity of the copolymer 2, PMVE, PEVE or PPVE is preferred.

The copolymer 2 preferably has at least one of POAVE units and DVE units.

As POAVE, the compound 8 may, for example, be mentioned.

As $R^{f2}$ in the compound 8, the perfluoroalkyl group may be linear or branched. The number of carbon atoms in $R^{f2}$ is preferably from 1 to 3.

When n is 0, m is preferably 3 or 4.

When n is 1, m is preferably an integer of from 2 to 4.

When n is 2 or 3, m is preferably 0.

n is preferably an integer of from 1 to 3.

When the number of carbon atoms in $R^{f2}$, n and m are within the above ranges, the productivity of the copolymer 2 will improve, and low temperature properties of a crosslinked product of the first composition will be excellent.

As specific examples of the compound 8, the following compounds may be mentioned.

C9PEVE, C7PEVE, EEAVE, EEEAVE, $CF_2$=CF—$OCF_2$—$OCF_3$, $CF_2$=CF—$OCF_2$—$OCF_2CF_3$, $CF_2$=CF—$O(CF_2CF(CF_3)O)_2CF_2CF_2CF_3$, $CF_2$=CF—$OCF_2$—$OCF_3$, etc.

As the compound 8, with a view to improving the productivity of the copolymer 2 and in view of excellent low temperature properties of a crosslinked product of the first composition, C9PEVE, C7PEVE, EEAVE or EEEAVE is preferred.

Such compounds may be produced by the methods disclosed in WO00/56694 from corresponding alcohols as the raw material.

In a case where the copolymer 2 has DVE units, rubber properties of a crosslinked product of the first composition are likely to be maintained, and the low temperature properties will be excellent as well.

The polymerizable unsaturated bond may, for example, be a double bond or a triple bond between carbon atom-carbon atom, and is preferably a double bond. The number of the polymerizable unsaturated bonds is preferably from 2 to 6, more preferably 2 or 3, particularly preferably 2.

DVE is preferably a perfluoro compound.

As DVE, compound 9 represented by the formula 9 is preferred in that while rubber properties of a crosslinked product of the first composition are maintained, the low temperature properties will be more excellent.

$$CF_2=CF—OR^{f3}OCF=CF_2 \qquad \text{formula 9}$$

wherein $R^{f3}$ is a $C_{1-25}$ perfluoroalkylene group or a $C_{2-25}$ perfluoroalkylene group having at least one etheric oxygen atom.

The perfluoroalkylene group as $R^{f3}$ may be linear or branched. The number of carbon atoms in $R^{f3}$ is preferably 3 or 4, in that while rubber properties of a crosslinked product of the first composition are maintained, the low temperature properties will be more excellent.

As specific examples of the compound 9, the following compounds may be mentioned.

$CF_2$=$CFO(CF_2)_2OCF$=$CF_2$,
C3DVE,
C4DVE,
$CF_2$=$CFO(CF_2)_6OCF$=$CF_2$,
$CF_2$=$CFO(CF_2)_8OCF$=$CF_2$,
$CF_2$=$CFO(CF_2)_2OCF(CF_3)CF_2OCF$=$CF_2$,
$CF_2$=$CFO(CF_2)_2O(CF(CF_3)CF_2O)_2CF$=$CF_2$,
$CF_2$=$CFOCF_2O(CF_2CF_2O)_2CF$=$CF_2$,
$CF_2$=$CFO(CF_2O)_3(CF(CF_3)CF_2O)_2CF$=$CF_2$,
$CF_2$=$CFOCF_2CF(CF_3)O(CF_2)_2OCF(CF_3)CF_2OCF$=$CF_2$,
$CF_2$=$CFOCF_2CF_2O(CF_2O)_2CF_2CF_2OCF$=$CF_2$, etc.

As the compound 9, C3DVE or C4DVE is preferred in that while rubber properties of a crosslinked product of the first composition are maintained, the low temperature properties will be more excellent.

As other monomer in the copolymer 2, a monomer having a fluorine atom and a halogen atom other than a fluorine atom (such as bromotrifluoroethylene or iodotrifluoroethylene) and a monomer having a fluorine atom and a nitrile group (such as $CF_2$=$CFO(CF_2)_5CN$ or perfluoro(8-cyano-5-methyl-3,6-dioxa-1-octene)) may, for example, be mentioned.

The proportion of the TFE units is preferably from 35 to 75 mol %, more preferably from 40 to 75 mol %, further preferably from 50 to 75 mol %, to the total amount of all units constituting the copolymer 2.

The proportion of the PAVE units is preferably from 25 to 65 mol %, more preferably from 25 to 57 mol %, further preferably from 25 to 40 mol %, to the total amount of all units constituting the copolymer 2.

The proportion of the POAVE units is preferably from 3 to 57 mol %, more preferably from 5 to 40 mol %, further preferably from 8 to 30 mol %, to the total amount of all units constituting the copolymer 2.

The proportion of the DVE units is preferably from 0.01 to 1 mol %, more preferably from 0.05 to 0.5 mol %, further preferably from 0.05 to 0.3 mol %, to the total amount of all units constituting the copolymer 2.

The proportion of the units based on other monomer in the copolymer 2 is preferably from 0 to 5 mol %, more preferably from 0 to 3 mol %, further preferably from 0 to 2 mol %, to the total amount of all units constituting the copolymer 2.

When the proportions of the TFE units, the PAVE units, the POAVE units, the DVE units and the units based on other monomer in the copolymer 2 are within the above ranges, while rubber properties of a crosslinked product of the first composition are maintained, low temperature properties, alkali resistance and interlaminar strength at high temperature will be more excellent.

The copolymer 2 preferably further has iodine atoms in view of more excellent crosslinkability. The iodine atoms are preferably bonded to the terminal of the polymer chain of the copolymer 2. The terminal of the polymer chain includes both the terminal of the main chain and the terminal of the branched chain.

The content of iodine atoms is preferably from 0.01 to 1.5 mass %, more preferably from 0.01 to 1.0 mass % to the copolymer 2. When the content of iodine atoms is within the above range, crosslinkability of the copolymer 2 will be more excellent.

The elastic shear modulus G' of the copolymer 2 is preferably from 100 kPa to 600 kPa, more preferably from 200 kPa to 500 kPa, further preferably from 200 kPa to 400 kPa. A higher elastic shear modulus G' means a higher molecular weight of the polymer and a higher density of entanglement of the polymer chain. When the elastic shear modulus G' of the copolymer 2 is within the above range, mechanical properties of the obtainable crosslinked product such as tensile strength will be more excellent.

(Method for Producing Copolymer)

The copolymer 1 may be produced, for example, by polymerizing monomer components including TFE and propylene in the presence of a radical polymerization initiator. The monomer components for producing the copolymer 1 may contain, as the case requires, at least one member selected from the group consisting of PAVE, DVE and other monomers. The copolymer 1 may be produced, for example, by the method disclosed in WO2009/119202, WO2010/053056, etc.

The copolymer 2 may be produced, for example, by polymerizing monomer components including TFE and PAVE in the presence of a radical polymerization initiator. The monomer components for producing the copolymer 2 may include, as the case requires, POAVE, DVE and other monomer. The copolymer 2 may be produced, for example, by the method as disclosed in WO2010/082633.

Hereinafter, the method for producing the copolymer 1 and the copolymer 2 will be described, and in the description of the production method, the copolymer means the copolymer 1 and the copolymer 2.

As a method for producing the copolymer by polymerizing the monomer components, radical polymerization method is preferred.

As a radical polymerization initiation source, a radical polymerization initiator, heating or irradiation with ionizing radiation may, for example, be mentioned. Among them, in view of excellent productivity of the copolymer, a radical polymerization initiator is preferred.

As the radical polymerization initiator, preferred is a compound having a temperature at which the half life is 10 hours of from 0 to 100° C., and particularly preferred is a compound having the temperature of from 20 to 90° C.

The radical polymerization initiator may, for example, be an azo compound (such as azobisisobutylonitrile), a non-fluorinated diacyl peroxide (such as isobutyryl peroxide, octanoyl peroxide, benzoyl peroxide or lauroyl peroxide), a peroxydicarbonate (such as diisopropyl peroxydicarbonate), a peroxyester (such as tert-butyl peroxypivarate or tert-butyl peroxyisobutyrate or tert-butyl peroxyacetate), a fluorinated diacyl peroxide (such as compound represented by the following formula 10), or a persulfate (such as potassium persulfate, sodium persulfate or ammonium persulfate).

$$(Z(CF_2)_rCOO)_2 \qquad \text{formula 10}$$

wherein Z is a hydrogen atom, a fluorine atom or a chlorine atom, and r is an integer of from 1 to 10.

As the radical polymerization initiator to be used for emulsion polymerization described hereinafter, a water-soluble initiator is preferred. The water-soluble initiator may, for example, be a persulfate (such as ammonium persulfate, sodium persulfate or potassium persulfate), hydrogen peroxide, an organic peroxide (such as disuccinic acid peroxide, diglutaric acid peroxide or tert-butyl hydroxyperoxide), an azo compound (such as azobisisobutylamidine dihydrochloride), a redox initiator comprising a combination of persulfuric acid or hydrogen peroxide and a reducing agent (such as sodium hydrogen sulfite or sodium thiosulfate), or an initiator comprising a redox initiator and further a small amount of iron, ferrous salt, silver sulfate or the like.

The amount of the radical polymerization initiator is preferably from 0.0001 to 5 parts by mass, more preferably from 0.001 to 2 parts by mass per 100 parts by mass of the monomer components.

In a case where the radical polymerization initiator is used, it is preferred that the monomer components are polymerized in the presence of a chain transfer agent.

The chain transfer agent may, for example, be an alcohol (such as methanol or ethanol), a chlorofluorohydrocarbon (such as 1,3-dichloro-1,1,2,2,3-pentafluoropropane or 1,1-dichloro-1-fluoroethane), a hydrocarbon (such as pentane, hexane or cyclohexane), compound 11 represented by the following formula 11, compound 12 represented by the following formula 12 or mercaptan (such as tert-dodecylmercaptan or n-octadecylmercaptan).

$$R^{fA}I_2 \qquad \text{formula 11}$$

$$R^{fA}IBr \qquad \text{formula 12}$$

wherein $R^{fA}$ is a $C_{1-16}$ polyfluoroalkylene group.

As $R^{fA}$, the polyfluoroalkylene group may be linear or branched. $R^{fA}$ is preferably a perfluoroalkylene group.

The compound 11 may, for example, be 1,4-diiodoperfluorobutane, 1,2-diiodoperfluoroethane, 1,3-diiodoperfluoropropane, 1,5-diiodoperfluoropentane, 1,6-diiodoperfluorohexane or 1,8-diiodoperfluorooctane.

The compound 12 may, for example, be 1-iodo-4-bromoperfluorobutane, 1-iodo-4-bromoperfluorobutane, 1-iodo-6-bromoperfluorohexane or 1-iodo-8-bromoperfluorooctane.

The amount of the chain transfer agent is properly set based on the chain transfer constant of the chain transfer agent. In a case where the compound 11 or the compound 12 is used as the chain transfer agent, the amount of the chain transfer agent is preferably from 0.01 to 5 mass %, more preferably from 0.05 to 2 mass % per 100 parts by mass of the monomer components.

As the polymerization method, emulsion polymerization method, solution polymerization method, suspension polymerization method or bulk polymerization method may, for example, be mentioned. Among them, in view of adjustment of the molecular weight and the copolymer composition and excellent productivity, emulsion polymerization method is preferred.

In the emulsion polymerization method, the monomer components are polymerized in an aqueous medium containing an emulsifier.

The aqueous medium may, for example, be water or a mixture of water and a water-soluble organic solvent.

The water-soluble organic solvent may, for example, be tert-butanol, propylene glycol, dipropylene glycol, dipropylene glycol monomethyl ether or tripropylene glycol, and in that the polymerization rate of monomers will not lower, it is preferably tert-butanol or dipropylene glycol monomethyl ether.

When the aqueous medium contains a water-soluble organic solvent, dispersibility of the monomers and dispersibility of the copolymer will be more excellent, and the productivity of the copolymer will be excellent.

The content of the water-soluble organic solvent is preferably from 1 to 40 parts by mass, more preferably from 3 to 30 parts by mass per 100 parts by mass of water.

The emulsifier may, for example, be an anionic emulsifier, a nonionic emulsifier or a cationic emulsifier, and in view of more excellent mechanical and chemical stability of the latex, an anionic emulsifier is preferred.

The anionic emulsifier may, for example, be a hydrocarbon emulsifier (such as sodium lauryl sulfate or sodium dodecylbenzene sulfonate), a fluorinated emulsifier (such as ammonium perfluorooctanoate, sodium perfluorooctanoate, ammonium perfluorohexanoate or compound 13 represented by the following formula 13).

$$F(CF_2)_pO(CF(X)CF_2O)_qCF(Y)COOA \qquad \text{formula 13}$$

wherein X and Y are a fluorine atom or a $C_{1-3}$ linear or branched perfluoroalkyl group, A is a hydrogen atom, an alkali metal or $NH_4$, p is an integer of from 2 to 10, and q is an integer of from 0 to 3.

As the compound 13, the following compounds may, for example, be mentioned.

$C_2F_5OCF_2CF_2OCF_2COONH_4$
$F(CF_2)_3O(CF(CF_3)CF_2O)_2CF(CF_3)COONH_4$
$F(CF_2)_3OCF_2CF_2OCF_2COONH_4$
$F(CF_2)_3O(CF_2CF_2O)_2CF_2COONH_4$
$F(CF_2)_4OCF_2CF_2OCF_2COONH_4$,
$F(CF_2)_4O(CF_2CF_2O)_2CF_2COONH_4$
$F(CF_2)_3OCF_2CF_2OCF_2COONa$,
$F(CF_2)_3O(CF_2CF_2O)_2CF_2COONa$
$F(CF_2)_4OCF_2CF_2OCF_2COONa$
$F(CF_2)_4O(CF_2CF_2O)_2CF_2COONa$
$F(CF_2)_2OCF_2CF_2OCF_2COONH_4$
$F(CF_2)_2O(CF_2CF_2O)_2CF_2COONH_4$
$F(CF_2)_2OCF_2CF_2CF_2COONa$,
$F(CF_2)_2O(CF_2CF_2O)_2CF_2COONa$

The anionic emulsifier is preferably ammonium perfluorooctanoate, $C_2F_5OCF_2CF_2OCF_2COONH_4$, $F(CF_2)_4OCF_2CF_2OCF_2COONH_4$ or $F(CF_2)_3OCF_2CF_2OCF_2COONH_4$.

The amount of the emulsifier is preferably from 0.01 to 15 parts by mass, more preferably from 0.1 to 10 parts by mass per 100 parts by mass of the aqueous medium.

By the emulsion polymerization method, a latex containing a copolymer is obtained. The copolymer is separated from the latex by aggregation.

The aggregation method may, for example, be addition of a metal salt, addition of an inorganic acid (such as hydrochloric acid), mechanical shearing or freezing and defrosting.

The polymerization conditions for radical polymerization are properly selected depending upon the monomer composition and the decomposition temperature of the radical polymerization initiator.

The polymerization pressure is preferably from 0.1 to 20 MPa [gauge], more preferably from 0.3 to 10 MPa [gauge], further preferably from 0.3 to 5 MPa [gauge].

The polymerization temperature is preferably from 0 to 100° C., more preferably from 10 to 90° C., further preferably from 20 to 80° C.

The polymerization time is preferably from 1 to 72 hours, more preferably from 1 to 24 hours, further preferably from 1 to 12 hours.

(Component Contained in First Composition)

The first composition contains, in addition to the fluorinated elastic polymer, as additives, a crosslinking agent and a crosslinking aid. It preferably further contains an antioxidant. The first composition may further contain a polymer other than the fluorinated elastic polymer of the present invention and a component other than the above additives.

The crosslinking agent may, for example, be an organic peroxide, a polyol, an amine, triazine, imidazole, aniline or an ammonium salt. Among them, in view of excellent productivity, heat resistance and chemical resistance, an organic peroxide is preferred.

The organic peroxide may, for example, be dibenzoyl peroxide, dicumyl peroxide, di(tert-butyl) peroxide, tert-butyl peroxyacetate, tert-butyl peroxyisopropylcarbonate, tert-butyl peroxybenzoate, 2,5-dimethyl-2,5-bis(tert-butylperoxy)hexane, 2,5-dimethyl-2,5-bis(tert-butylperoxy)hexyne-3, α,α'-bis(tert-butylperoxy)-p-diisopropylbenzene or 2,5-dimethyl-2,5-bis(benzoylperoxy)hexane. They may be used alone or in combination of two or more.

In a case where the first composition contains an organic peroxide as the crosslinking agent, the content of the organic peroxide is preferably from 0.01 to 10 parts by mass, more preferably from 0.1 to 5 parts by mass per 100 parts by mass of the copolymer 1 or the copolymer 2. When the content of the organic peroxide is within the above range, interlaminar strength between the first layer and the second layer at high temperature will be more excellent.

The crosslinking aid may, for example, be a compound having at least two unsaturated bonds in one molecule. The crosslinking aid may, for example, be specifically triallyl cyanurate, triallyl isocyanurate, bismaleimide, ethylene glycol dimethacrylate, 1,4-butanediol dimethacrylate, trimethylolpropane trimethacrylate or divinylbenzene. Among them, triallyl cyanurate or triallyl isocyanurate is preferred.

The content of the crosslinking aid in the first composition is preferably from 0.1 to 10 parts by mass, more preferably from 0.5 to 7 parts by mass per 100 parts by mass of the copolymer 1 or the copolymer 2. When the content of the crosslinking aid is within the above range, properties of a crosslinked product of the first composition such as hardness or heat resistance will be excellent.

In the process for producing the laminate of the present invention, it is preferred that at least one of the first composition and the second composition contains an antioxidant, whereby the absolute value of the crosslinking rate difference as calculated in accordance with the formula 1 is likely to be controlled to be within a predetermined range and further, a laminate of which the tensile strength, the elongation at break, etc. which are rubber properties of a fluororubber are practically sufficiently maintained can easily be produced.

The antioxidant is preferably a compound having a phenolic hydroxy group.

The compound having a phenolic hydroxy group may, for example, be bisphenol A, bisphenol AF, phenol, cresol, p-phenylphenol, m-phenylphenol, o-phenylphenol, allylphenol, p-hydroxybenzoic acid or ethyl p-hydroxybenzoate. Among them, o-phenylphenol is more preferred.

In a case where the first composition contains an antioxidant, the content of the antioxidant is preferably from 0.01 to 5 parts by mass, more preferably from 0.01 to 3 parts by mass, further preferably from 0.01 to 2 parts by mass per 100 parts by mass of the after-described copolymer 1 or copolymer 2.

In the present invention, it is also preferred that a nitrogen-containing compound such as an amine or an imine is incorporated into the first composition. By incorporating a nitrogen-containing compound into the first composition, interlaminar strength between the first layer and the second layer at high temperature can further be improved.

The nitrogen-containing compound may, for example, be specifically 1,8-diazabicyclo[5.4.0]undecene-7, 1,5-diazabicyclo[4.3.0]nonene-5, 1,4-diazabicyclo[2.2.2]octane, triethylamine, tributylamine, diphenylamine, piperidine, morpholine, pyridine, benzotriazole or p-dimethylaminopyridine.

The amount of the nitrogen-containing compound incorporated in the first composition is preferably from 0.01 to 2 parts by mass, more preferably from 0.05 to 1 part by mass per 100 parts by mass of the copolymer 1.

As other component, a fluorinated elastic polymer other than the copolymer 1 and the copolymer 2, and additives other than the above may, for example, be mentioned.

Other fluorinated elastic polymer may, for example, be a copolymer having TFE units and PAVE units and having no P units, a copolymer having HFP units and VdF units and having no P units, a copolymer having HFP units, VdF units and TFE units and having no P units, or a copolymer having TFE units, PAVE units and VdF units and having no P units.

In a case where the first composition contains other fluorinated elastic polymer, the content of other fluorinated elastic polymer is preferably at most 50 parts by mass per 100 parts by mass of the fluorinated elastic copolymer in the present invention.

Further, the first composition may contain a non-fluorinated elastic polymer in a small amount relative to the fluorinated elastic polymer. The non-fluorinated elastic polymer may be the non-fluorinated elastic polymer contained in the second composition. In a case where the first composition contains a small amount of the non-fluorinated elastic polymer, it is considered that compatibility at the interface between the layer of the first composition and the layer of the second composition improves and further, crosslinking reaction at the interface between the layer of the first composition and the layer of the second composition is likely to proceed.

In a case where the first composition contains the non-fluorinated elastic polymer, the content of the non-fluorinated elastic polymer to the total amount of the fluorinated elastic polymer and the non-fluorinated elastic polymer in the first composition is preferably at most 30 mass %, more preferably at most 15 mass %.

The additive other than the above may, for example, be a filler, a processing aid, a dispersing aid, a plasticizer, a softening agent, an antioxidant, a bonding aid or a crosslinking accelerator.

The filler may, for example, be carbon black, fumed silica, wet silica, impalpable quartz powder, diatomaceous earth, zinc oxide, basic magnesium carbonate, activated calcium carbonate, magnesium silicate, aluminum silicate, titanium dioxide, talc, mica powder, aluminum sulfate, calcium sulfate, barium sulfate, asbestos, graphite, wollastonite, molybdenum disulfide, carbon fibers, aramid fibers, whiskers or glass fibers.

The processing aid may, for example, be a fatty acid derivative such as sodium stearate, amide stearate or calcium stearate, a phosphoric acid derivative, natural wax or synthetic wax.

The dispersing aid may, for example, be a higher fatty acid or its amine salt.

The plasticizer may, for example, be a phthalic acid derivative, an adipic acid derivative or a sebacic acid derivative.

The softening agent may, for example, be a lubricating oil, a process oil, coal tar or castor oil.

The antioxidant may, for example, be phenylenediamine, a hindered amine, a phosphate, quinoline, cresol or a dithiocarbamate metal salt.

The bonding aid may, for example, be a silane coupling agent or a titanate coupling agent.

The crosslinking accelerator may, for example, be an oxide of a bivalent metal such as magnesium oxide, calcium oxide, zinc oxide or lead oxide, or a compound having a guanidine structure.

In addition, a coloring agent, an ultraviolet absorber, a flame retardant, an oil resistance-improving agent, a foaming agent, an antiscorching agent, a tackifier, a lubricant or the like may be blended as the case requires.

When the first composition contains the copolymer 2 and further contains a metal oxide, the crosslinking reaction tends to proceed rapidly and securely.

The content of the metal oxide is preferably from 0.1 to 10 parts by mass, more preferably from 0.5 to 5 parts by mass per 100 parts by mass of the copolymer 2. When the content of the metal oxide is within the above range, the crosslinked product of the first composition will be excellent in hardness.

The first composition may be prepared by mixing the copolymer 1 or the copolymer 2, the crosslinking agent and the crosslinking aid and as the case require, other component, by a kneading method using a kneading apparatus such as a roll, a kneader, a Bunbury mixer or an extruder.

(Second Composition)

The second composition contains a non-fluorinated elastic polymer and a crosslinking agent and optionally contains a crosslinking aid. The second composition may contain other additive within a range not to impair the effects of the present invention.

The non-fluorinated elastic polymer is not particularly limited so long as it is an elastic polymer which can be a raw material of a crosslinked rubber containing no fluorine atom (non-fluororubber). The non-fluorinated elastic polymer is preferably crosslinked by an organic peroxide. Further, as described above, the Mooney viscosity of the non-fluorinated elastic polymer is preferably from 5 to 120, more preferably from 10 to 110, further preferably from 20 to 70.

The non-fluororubber may, for example, be a rubber containing no fluorine atom as disclosed in JIS K6297:2005. Specifically, polyacrylate rubber (ACM), ethylene acrylate rubber (AEM), ethylene/propylene/diene rubber (EPDM), silicone rubber, ethylene/propylene rubber (EPM), ethylene/vinyl acetate rubber (EVM), chloroprene rubber (CR), butyl rubber (IIR), isoprene rubber (IR), butadiene rubber (BR), chlorinated polyethylene rubber (CM) or chlorosulfonated polyethylene (CSM) may, for example, be mentioned. The silicone rubber may, for example, be dimethyl silicone rubber (MQ), methyl vinyl silicone rubber (VMQ) or methyl phenyl silicone rubber (PMQ). They may be used alone or in combination of two or more.

As a commercial elastic polymer as a raw material of ACM, Nipol (registered trademark) AR31 (manufactured by Zeon Corporation) may, for example, be mentioned.

As a commercial elastic polymer as a raw material of AEM, VAMAC (registered trademark) DP or VAMAC (registered trademark) G (manufactured by Chemours) may, for example, be mentioned.

As a commercial elastic polymer as a raw material of EVM, DENKA ER (registered trademark) 5300 or DENKA ER (registered trademark) 8401 (manufactured by Denka Company Limited) may, for example, be mentioned.

As a commercial elastic polymer as a raw material of EPDM, ESPRENE (registered trademark) EPDM (manufactured by SUMITOMO CHEMICAL COMPANY, LIMITED) may, for example, be mentioned.

As a commercial elastic polymer as a raw material of silicone rubber, KE971TU (manufactured by Shin-Etsu Silicone), KE951U (manufactured by Shin-Etsu Silicone) may, for example, be mentioned.

As the crosslinking agent in the second composition, crosslinking agents similar to the crosslinking agents for the first composition may, for example, be mentioned.

In a case where the second composition contains an organic peroxide as the crosslinking agent, the content of the organic peroxide is preferably from 0.01 to 10 parts by mass, more preferably from 0.1 to 5 parts by mass per 100 parts by mass of the non-fluorinated elastic polymer. When the content of the organic peroxide is within the above range, interlaminar strength between the first layer and the second layer at high temperature will be more excellent.

In a case where the second composition contains a crosslinking aid, as the crosslinking aid in the second composition, crosslinking aids similar to the crosslinking aids for the first composition may, for example, be mentioned.

In a case where the second composition contains the crosslinking aid, the content of the crosslinking aid in the second composition is preferably from 0.1 to 20 parts by mass, more preferably from 1 to 10 parts by mass per 100 parts by mass of the non-fluorinated elastic polymer. When the content of the crosslinking aid is within the above range, interlaminar strength between the first layer and the second layer at high temperature will be more excellent.

As described above, the second composition preferably contains an antioxidant in the same manner as the first composition. As the antioxidant contained in the second composition, antioxidants similar to the antioxidants for the first composition may, for example, be mentioned. The antioxidant contained in the second composition may be the same antioxidant as the antioxidant contained in the first composition, or may be a different antioxidant.

In a case where the second composition contains the antioxidant, the content of the antioxidant is preferably from 0.01 to 5 parts by mass, more preferably from 0.01 to 3 parts by mass, further preferably from 0.01 to 2 parts by mass per 100 parts by mass of the after-described non-fluorinated elastic polymer.

In the present invention, it is also preferred to incorporate a nitrogen-containing compound such as an amine or an imine into the second composition. By incorporating a nitrogen-containing compound into the second composition, interlaminar strength between the first layer and the second layer at high temperature can further be improved. As the nitrogen-containing compound, nitrogen-containing compounds similar to the nitrogen-containing compounds for the first composition may, for example, be mentioned.

The amount of the nitrogen-containing compound incorporated in the second composition is preferably from 0.01 to 2 parts by mass, more preferably from 0.05 to 1 part by mass per 100 parts by mass of the non-fluorinated elastic polymer.

As the additive in the second composition, additives similar to the additives for the first composition may, for example, be mentioned.

Further, the second composition may contain a fluorinated elastic polymer in a small amount relative to the non-fluorinated elastic polymer. The fluorinated elastic polymer is not limited to the copolymer 1 and the copolymer 2 contained in the first composition, and may be other fluorinated elastic polymer. In a case where the second composition contains a small amount of the fluorinated elastic polymer, it is considered that compatibility at the interface between the layer of the first composition and the layer of the second composition will improve and in addition, the crosslinking reaction at the interface between the layer of the first composition and the layer of the second composition is likely to proceed.

In a case where the second composition contains the fluorinated elastic polymer, the content of the fluorinated elastic polymer to the total amount of the non-fluorinated elastic polymer and the fluorinated elastic polymer in the second composition is preferably at most 30 mass %, more preferably at most 15 mass %.

The second composition may be prepared by mixing the non-fluorinated elastic polymer and the crosslinking agent and as the case requires, the crosslinking aid and the additive, by a kneading method using a kneading apparatus similar to that for the first composition.

(Lamination Method)

The method for laminating the layer of the first composition and the layer of the second composition is not particularly limited.

In the process for producing the laminate of the present invention, it is preferred that the layer of the first composition and the layer of the second composition are laminated in a non-crosslinked state to obtain a non-crosslinked laminate, followed by crosslinking to form a crosslinked structure in the layer of the first composition and in the layer of the second composition and a crosslinked structure between the layer of the first composition and the layer of the second composition, that is, co-crosslinking. By co-crosslinking, the laminate obtained by the process for producing the laminate of the present invention will be more excellent in interlaminar strength between the first layer and the second layer at high temperature.

For co-crosslinking, it is preferred to incorporate, as the crosslinking agent for the first composition and the second composition, an organic peroxide, whereby the laminate obtained by the process for producing the laminate of the present invention will be more excellent in interlaminar strength between the first layer and the second layer at high temperature.

In a case where sulfur is used as the crosslinking agent, co-crosslinking may also be called co-vulcanization.

As a method of crosslinking the first composition and second composition in the non-crosslinked laminate, a crosslinking method by heating or a crosslinking method by irradiation with ultraviolet rays may, for example, be mentioned.

As the method for crosslinking the first composition and the second composition, a method by heating is preferred. As specific examples of the crosslinking method by heating, hot press crosslinking, steam crosslinking or hot air crosslinking may, for example, be mentioned.

For example, a method may be employed in which primary crosslinking is conducted by heating at from 100 to 400° C. for from several seconds to 24 hours, and then secondary crosslinking is conducted by heating at from 100 to 300° C. for from 30 minutes to 48 hours. Although secondary crosslinking is not essential, by conducting secondary crosslinking, mechanical properties, compression set and other properties of the crosslinked product can further be stabilized or further be improved.

As a specific method of the process for producing the laminate of the present invention, a method of co-extruding the first composition and the second composition to obtain a non-crosslinked laminate, and crosslinking the non-crosslinked laminate, a method of forming the first composition and the second composition respectively into a sheet, and bonding the sheet of the first composition and the sheet of the second composition by hot pressing, or a method by injection molding of injecting the first composition and the second composition into a mold, may, for example, be mentioned.

In the process for producing the laminate of the present invention, it is preferred that the first layer and the second layer are directly in contact with each other. However, an adhesive may be applied between layers, or an adhesive thin layer may be inserted between the layers, so as to improve the adhesion, within a range not to impair co-crosslinking of the first layer and the second layer. The adhesive is preferably a silane coupling agent, and may, for example, be specifically vinyltriethoxysilane, vinyltris(2-methoxyethoxy)silane, 3-aminopropyltriethoxysilane or 3-glycidoxypropyltriethoxysilane.

(Mechanism of Action)

In the above-described process for producing the laminate of the present invention, since the first composition contains the copolymer having TFE units and P units or the copolymer having TFE units and PAVE units, a laminate excellent in alkali resistance can be produced. Further, since the absolute value of the crosslinking rate difference between the first composition and the second composition is at most 0.30, a laminate excellent in interlaminar strength at high temperature can be produced.

<Application>

The laminate of the present invention, which will hardly undergo peeling at high temperature, is suitable as a member to be used at high temperature.

The laminate of the present invention is suitable, for example, as a hose. A hose comprising the laminate of the present invention (hereinafter referred to as laminated rubber hose) may have a layer other than the first layer and the second layer. In this specification, a hose and a tube are not distinguished and are generally referred to as a "hose".

By disposing the first layer as the innermost layer in the laminated rubber hose, a lamented rubber hose the inner surface of which is excellent in heat resistance, chemical resistance, oil resistance, weather resistance, alkali resistance and steam resistance can be obtained. Further, by disposing the first layer as the outermost layer, a laminated rubber hose the outer surface of which is excellent in heat resistance, chemical resistance, oil resistance, weather resistance, alkali resistance and steam resistance can be obtained.

As application of the laminated rubber hose, a rubber hose for transport such as an automobile, a ship or an aircraft, for a liquid crystal device, for a semiconductor device, for a food production apparatus, for an analytical instrument, for chemical plant equipment or for atomic power plant equipment may, for example, be mentioned.

As specific examples, a hose for turbo charger, a PCV hose, an oil return hose, an exhaust gas hose, an EGR hose, an oil hose, a sterilizing hose, a disinfecting hose, a fuel hose, an oil resistant rubber hose, a combustion gas resistant rubber hose, a break oil resistant rubber hose, a chemical resistant rubber hose, a flon resistant rubber hose, a hot air resistant rubber hose, a rubber hose for a gas heat pump, a hydraulic break hose, an engine oil hose, a radiator hose, a vacuum hose, an evaporator hose, an ATF hose, a hose for water piping and a hose for steam piping may, for example, be mentioned.

The method for producing the laminated rubber hose is not particularly limited. For example, the first composition and the second composition are co-extruded into a tube to obtain a non-crosslinked laminate, and the non-crosslinked laminate is crosslinked to obtain a laminated rubber hose.

Otherwise, the first or second composition is extruded into a tube, and the second or first composition is extruded on the surface of the tube to obtain a non-crosslinked laminate, which is crosslinked to obtain a laminated rubber hose having the inner layer formed of the first or second layer and the outer layer formed of the second or first layer.

The laminated rubber hose may be a multilayer rubber hose having the inner layer and the outer layer and further a layer formed of the first or second layer, or a multilayer rubber hose such as a three-layer rubber hose having a reinforced fiber layer on the surface of the outer layer, as well as a two-layer rubber hose having the inner layer formed of the first or second layer and the outer layer formed of the second or first layer. Further, it may have an adhesive thin layer of e.g. an adhesive, a layer comprising a thermoplastic resin or a metal thin layer between the first layer and the second layer. The reinforcing fibers for the laminated rubber hose may, for example, be para-aramid fibers or meth-aramid fibers. As a commercial product, Technora (manufactured by TEIJIN LIMITED) or Nomex (manufactured by Chemours) may, for example, be mentioned.

The laminate of the present invention may be used, for example, as a rubber roll.

As the application of the rubber roll, for example, a rubber roll for a film, a rubber roll for paper making, a rubber roll for plywood, and a rubber roll for steel may, for example, be mentioned.

The laminate of the present invention may be used, for example, as a sealing material.

The sealing material may, for example, be an O ring, a V ring, a gasket or a packing.

The laminate of the present invention may be used, for example, as an electric wire coating material.

In a coated electric wire of the present invention, the electric wire coating material to be formed on the outer periphery of a core wire may be formed directly in contact with the core wire or may be formed on the outer periphery indirectly with the core wire via another layer. Specifically, the coated electric wire of the present invention includes not only an insulating electric wire having a conductor or a core wire as a conductor directly coated with the laminate of the present invention as the electric wire coating material, but also an electric wire having the laminate of the present invention as the electric wire coating material formed as an outer layer, for example, a cable or a wire harness having a sheath. The cable may, for example, be a sensor cable or a power cable.

The conductor is not particularly limited and may, for example, be copper, a copper alloy, aluminum or an aluminum alloy, a plated wire by e.g. tin, silver or nickel, a stranded conductor, a superconductor, or a plated wire for a semiconductor device lead.

The laminate of the present invention may be used, for example, for a belt, a rubber cushion or a diaphragm, in addition to the above.

EXAMPLES

Now, the present invention will be described in further detail with reference to Examples. However, it should be understood that the present invention is by no means restricted thereto. Ex. 1 to 43 and 48 to 72 are Examples of the present invention, and Ex. 44 to 47 and 73 to 81 are Comparative Examples.

<Measurement Method>
(Copolymer Composition of Copolymer 1 and Copolymer 2)

The proportions (mol %) of the units constituting the copolymer 1 and the copolymer 2 were obtained by $^{19}$F-nuclear magnetic resonance (NMR) analysis, fluorine content analysis and infrared absorption spectrum analysis.
(Iodine Content of Copolymer 1 and Copolymer 2)

The iodine content of the copolymer 1 and the copolymer 2 was quantitatively determined by an apparatus which is a combination of automatic quick furnace combustion apparatus (manufactured by Mitsubishi Chemical Analytech Co., Ltd., AQF-100) and ion chromatography.
(Elastic Shear Modulus G' of Copolymer 1 and Copolymer 2)

Measured by a rubber process analyzer (manufactured by ALPHA TECHNOLOGIES, RPA-2000) in accordance with ASTM D5289 and D6204 at a temperature of 100° C. at an amplitude of 0.5° at a frequency of 50/min.
(Mooney Viscosity of Copolymer 1, Copolymer 2 and Non-Fluorinated Elastic Polymer)

Measured by using Mooney viscometer (manufactured by Shimadzu Corporation, SMV-201) in accordance with JIS K6300-1:2013 using a L rotor having a diameter of 38.1 mm and a thickness of 5.54 mm at 100° C. for a preheating time of one minute for a rotor rotating time of 4 minutes.
(Degree of Crosslinking of First Composition and Second Composition)

The degree of crosslinking is represented by a value (MH−ML) obtained by subtracting ML from MH, where MH is the maximum torque and ML is the minimum torque, measured by a rubber process analyzer (manufactured by ALPHA TECHNOLOGIES, RPA-2000).
($t_{90A}$, $t_{2A}$, $t_{90B}$ and $t_{2B}$ of First Composition and Second Composition)

$t_{2A}$ is a time required until the torque of the first composition starts increasing from the minimum torque, $t_{90A}$ is a time required until the torque of the first composition reaches 90% of the maximum torque, $t_{2B}$ is a time required until the torque of the second composition starts increasing from the minimum torque, and $t_{90B}$ is a time required until the torque of the second composition reaches 90% of the maximum torque, when a crosslinking test is carried out by a rubber process analyzer (manufactured by ALPHA TECHNOLOGIES, RPA-2000).

<Components>

Copolymer A1: copolymer 1, a copolymer having TFE units and P units, having a proportion of the TFE units of 56 mol % and a proportion of the P units of 44 mol % to the total amount of all units constituting the copolymer A1, G' of 160 kPa and a Mooney viscosity of 62, and containing no iodine atom.

Copolymer B1: copolymer 1, a copolymer having TFE units and P units, and having a proportion of the TFE units of 56 mol % and a proportion of the P units of 44 mol % to the total amount of all units constituting the copolymer B1, G' of 280 kPa and a Mooney viscosity of 90, and containing 0.4 mass % of iodine atoms to the total mass of the copolymer. The copolymer B1 may be produced by the method disclosed in WO2009/119202.

Copolymer B2: copolymer 1, a copolymer having TFE units and P units, and having a proportion of the TFE units of 56 mol % and a proportion of the P units of 44 mol % to the total amount of all units constituting the copolymer B2, G' of 330 kPa and a Mooney viscosity of 112, and containing 0.3 mass % of iodine atoms to the total mass of the copolymer. The copolymer B2 may be produced by the method disclosed in WO2009/119202.

Copolymer B3: copolymer 1, a copolymer having TFE units and P units, and having a proportion of the TFE units of 56 mol % and a proportion of the P units of 44 mol % to the total amount of all units constituting the copolymer B3, G' of 160 kPa and a Mooney viscosity of 66, and containing 0.7 mass % of iodine atoms to the total mass of the copolymer. The copolymer B3 may be produced by the method disclosed in WO2009/119202.

Copolymer B4: copolymer 1, a copolymer having TFE units and P units, and having a proportion of the TFE units of 56 mol % and a proportion of the P units of 44 mol % to the total amount of all units constituting the copolymer B4, G' of 70 kPa and a Mooney viscosity of 42, and containing 1.5 mass % of iodine atoms to the total mass of the copolymer. The copolymer B4 may be produced by the method disclosed in WO2009/119202.

Copolymer C1: copolymer 1, a copolymer having TFE units, C3DVE units and P units, and having a proportion of the TFE units of 56 mol %, a proportion of the P units of 43.8 mol % and a proportion of the C3DVE units of 0.2 mol % to the total amount of all units constituting the copolymer C1, G' of 330 kPa and a Mooney viscosity of 99, and containing 0.5 mass % of iodine atoms to the total mass of the copolymer. The copolymer C1 may be produced by the method disclosed in WO2017/057512.

Copolymer C2: copolymer 1, a copolymer having TFE units, C3DVE units and P units, and having a proportion of the TFE units of 56 mol %, a proportion of the P units of 43.8 mol % and a proportion of the C3DVE units of 0.2 mol % to the total amount of all units constituting the copolymer C2, G' of 160 kPa and a Mooney viscosity of 64, and containing 1.1 mass % of iodine atoms to the total mass of the copolymer. The copolymer C2 may be produced by the method disclosed in WO2017/057512.

Copolymer C3: copolymer 1, a copolymer having TFE units, C3DVE units and P units, and having a proportion of the TFE units of 56 mol %, a proportion of the P units of 43.8 mol % and a proportion of the C3DVE units of 0.2 mol % to the total amount of all units constituting the copolymer C3, G' of 524 kPa and a Mooney viscosity of 172, and containing 0.3 mass % of iodine atoms to the total mass of the copolymer. The copolymer C3 may be produced by the method disclosed in WO2017/057512.

Copolymer D1: copolymer 2, a copolymer having TFE units and PMVE units, and having a proportion of the TFE units of 69 mol % and a proportion of the PMVE units of 31 mol % to the total amount of all units constituting the copolymer D, G' of 550 kPa and a Mooney viscosity of 180, and containing 0.15 mass % of iodine atoms to the total mass of the copolymer. The copolymer D1 may be produced by the method disclosed in WO2010/082633.

Non-fluorinated elastic polymer A: raw material of AEM, VAMAC (registered trademark) DP, manufactured by Chemours Dupont, Mooney viscosity: 20.

Non-fluorinated elastic polymer B: raw material of AEM, VAMAC (registered trademark) G, manufactured by Chemours, Mooney viscosity: 16.

Non-fluorinated elastic polymer C: raw material of ACM, Nipol (registered trademark) AR31, manufactured by Zeon Corporation, Mooney viscosity: 41.

Non-fluorinated elastic polymer D: raw material of AEM, Denka ER (registered trademark) 5300, manufactured by Denka Company Limited, Mooney viscosity of 46.

Non-fluorinated elastic polymer E: raw material of silicone rubber, KE951U, manufactured by Shin-Etsu Silicone, Mooney viscosity: 17.

Non-fluorinated elastic polymer F: raw material of EPDM, ESPRENE (registered trademark) E 501A (manufactured by SUMITOMO CHEMICAL COMPANY, LIMITED), Mooney viscosity: 43.

Non-fluorinated elastic polymer G: raw material of AEM, Denka ER (registered trademark) 8401, manufactured by Denka Company Limited, Mooney viscosity: 36.

Crosslinking agent A: organic peroxide, α,α'-bis(tert-butylperoxy)-diisopropylbenzene), LUPEROX (registered trademark) F40P-SP2 (manufactured by Arkema).

Crosslinking agent B: organic peroxide, α,α'-bis(tert-butylperoxy)diisopropylbenzene, Parkadox 14 (tradename), manufactured by Kayaku Akzo Corporation.

Crosslinking agent C: organic peroxide, 2,5-dimethyl-2,5-bis(tert-butylperoxy)hexane), LUPEROX (registered trademark) 101-XL45-SP2 (manufactured by Arkema).

Crosslinking agent D: organic peroxide, 2,5-dimethyl-2,5-bis-(tert-butylperoxy)hexane, PERHEXA (registered trademark) 25B, manufactured by NOF CORPORATION.

Crosslinking agent E: organic peroxide, C-8 (tradename), manufactured by Shin-Etsu Chemical Co., Ltd.

Crosslinking agent F: organic peroxide, bis(α,α-dimethylbenzyl) peroxide, PERCUMYL (registered trademark) D, manufactured by NOF CORPORATION.

Crosslinking agent G: ammonium salt, ammonium benzoate, VULNOC AB-S, manufactured by OUCHI SHINKO CHEMICAL INDUSTRIAL CO., LTD.

Crosslinking agent H: imidazole, 2-methylimidazole, CN-25, manufactured by SHIKOKU CHEMICALS CORPORATION.

Crosslinking agent I: amine, 4,4'-methylenedianiline, Sumicure M, manufactured by SUMITOMO CHEMICAL COMPANY, LIMITED.

Crosslinking aid A: triallyl isocyanurate, 1,3,5-triallyl isocyanurate, TAIC (tradename), manufactured by Mitsubishi Chemical Corporation.

Crosslinking aid B: bismaleimide, m-phenylene bismaleimide, BMI-3000 (tradename), manufactured by Daiwa Kasei Industry Co., Ltd.

Crosslinking aid C: triallyl isocyanurate, 1,3,5-triallyl isocyanurate, TAIC WH-60 (tradename), manufactured by Mitsubishi Chemical Corporation.

Crosslinking aid D: butadiene, B-3000 (tradename), manufactured by Nippon Soda Co., Ltd.

Antioxidant: o-phenylphenol, manufactured by FUJIFILM Wako Pure Chemical Corporation.

Carbon black A: THENMAX N-990 (tradename), manufactured by Cancarb Limited.

Carbon black B: FEF, Asahi #60 carbon (tradename), manufactured by ASAHI CARBON CO., LTD.

Carbon black C: SAF, Asahi #90 (tradename), manufactured by ASAHI CARBON CO., LTD.

Carbon black D: MAF, SEAST 116 (tradename), manufactured by TOKAI CARBON CO., LTD.

Carbon black E: HAF, SEAST 3 (tradename), manufactured by TOKAI CARBON CO., LTD.

Processing aid A: fatty acid derivative, calcium stearate, manufactured by FUJIFILM Wako Pure Chemical Corporation.

Processing aid B: higher fatty acid, stearic acid, manufactured by FUJIFILM Wako Pure Chemical Corporation.

Processing aid C: fatty acid derivative, Emaster 510P (tradename), manufactured by RIKEN VITAMIN CO., LTD.

Processing aid D: nitrogen-containing compound, LIPOMIN 18D (tradename), manufactured by Lion Specialty Chemicals Co., Ltd.

Processing aid E: phosphoric acid derivative, PHOSPHANOL RL-210 (tradename), manufactured by TOHO Chemical Industry Co., Ltd.

Processing aid F: fatty acid derivative, sodium stearate, manufactured by NOF CORPORATION Plasticizer: ADK CIZER RS-735 (tradename), manufactured by ADEKA CORPORATION.

Antioxidant: hindered amine, NOCRAC CD (tradename), manufactured by OUCHI SHINKO CHEMICAL INDUSTRIAL CO., LTD.

Filler A: silica, AEROSIL 972 (tradename), manufactured by NIPPON AEROSIL CO., LTD.

Filler B: wet silica, Nipsil VN3 (tradename), manufactured by TOSOH SILICA CORPORATION Crosslinking accelerator A: zinc oxide, manufactured by SEIDO CHEMICAL INDUSTRY CO., LTD.

Crosslinking accelerator B: compound having guanidine structure, NOCCELER DT (tradename) manufactured by OUCHI SHINKO CHEMICAL INDUSTRIAL CO., LTD.

<Preparation of First Composition>

The copolymer and the compounding agents were uniformly kneaded in blend ratios by mass ratio as identified in Tables 1-1 to 1-4 by a twin roll mill to prepare first compositions 1 to 35. MH–ML, $t_{90A}$, $t_{2A}$ and the Mooney viscosity of each composition were measured by the above method. The results are shown in Tables 1-1 to 1-4. In Tables 1-1 to 1-4, "RPA conditions" represents the crosslinking conditions measured by a rubber process analyzer (manufactured by ALPHA TECHNOLOGIES, RPA-2000). For example, "170° C.×12 min" means that the first composition was crosslinked at 170° C. for 12 minutes.

TABLE 1-1

|  | First comp. 1 | First comp. 2 | First comp. 3 | First comp. 4 | First comp. 5 | First comp. 6 | First comp. 7 | First comp. 8 | First comp. 9 | First comp. 10 |
|---|---|---|---|---|---|---|---|---|---|---|
| Copolymer A1 | 100 | 90 | — | — | — | — | — | — | — | — |
| Copolymer B1 | — | — | 100 | 90 | 100 | 100 | 100 | 100 | 100 | 100 |
| Copolymer B2 | — | — | — | — | — | — | — | — | — | — |
| Copolymer B3 | — | — | — | — | — | — | — | — | — | — |
| Copolymer B4 | — | — | — | — | — | — | — | — | — | — |
| Copolymer C1 | — | — | — | — | — | — | — | — | — | — |
| Copolymer C2 | — | — | — | — | — | — | — | — | — | — |
| Copolymer C3 | — | — | — | — | — | — | — | — | — | — |
| Copolymer D1 | — | — | — | — | — | — | — | — | — | — |
| Non-fluorinated elastic polymer A | — | 10 | — | 10 | — | — | — | — | — | — |
| Crosslinking agent A | — | — | — | — | — | — | — | — | — | — |
| Crosslinking agent B | 1.0 | 1.0 | 1.5 | 1.5 | 1.5 | 1.5 | 1.5 | 1.5 | 1.5 | 1.5 |
| Crosslinking agent C | — | — | — | — | — | — | — | — | — | — |
| Crosslinking agent D | — | — | — | — | — | — | — | — | — | — |
| Crosslinking aid A | 5.0 | 5.0 | 5.0 | 5.0 | — | 5.0 | 5.0 | 5.0 | 5.0 | 5.0 |
| Crosslinking aid B | — | — | — | — | 5.0 | — | — | — | — | — |
| Crosslinking aid C | — | — | — | — | — | — | — | — | — | — |
| Antioxidant | — | — | — | — | — | 0.30 | 0.16 | 1.18 | 1.23 | 0.80 |
| Carbon black A | 30 | 30 | 30 | 30 | 30 | 30 | 30 | 30 | 30 | 30 |
| Carbon black B | — | — | — | — | — | — | — | — | — | — |
| Processing aid A | 1.0 | 1.0 | 1.0 | 1.0 | 1.0 | 1.0 | 1.0 | 1.0 | 1.0 | 1.0 |
| Processing aid C | — | — | 2 | 2 | 2 | 2 | 2 | 2 | 2 | 2 |
| Processing aid F | — | — | — | — | — | — | — | — | — | — |
| Filler A | — | — | — | — | — | — | — | — | — | — |
| RPA conditions | 170° C. × 12 min | 170° C. × 12 min | 170° C. × 12 min | 170° C. × 12 min | 170° C. × 12 min | 170° C. × 20 min | 170° C. × 20 min | 170° C. × 20 min | 170° C. × 20 min | 170° C. × 20 min |
| Degree of crosslinking MH-ML | 28.54 | 44.09 | 35.87 | 58.17 | 11.93 | 32.98 | 34.66 | 24.45 | 24.46 | 29.21 |

TABLE 1-1-continued

|  | First comp. 1 | First comp. 2 | First comp. 3 | First comp. 4 | First comp. 5 | First comp. 6 | First comp. 7 | First comp. 8 | First comp. 9 | First comp. 10 |
|---|---|---|---|---|---|---|---|---|---|---|
| $t_{90.4}$ [min] | 8.78 | 8.74 | 3.4 | 4.5 | 2.25 | 5.29 | 4.56 | 10.35 | 10.07 | 8.29 |
| $t_{2.4}$ [min] | 1.09 | 0.98 | 0.6 | 0.66 | 0.73 | 0.74 | 0.69 | 1.04 | 1.02 | 0.88 |
| SP value | 8.8 | 8.8 | 8.8 | 8.8 | 8.8 | 8.8 | 8.8 | 8.8 | 8.8 | 8.8 | comp.: composition

TABLE 1-2

|  | First comp. 11 | First comp. 12 | First comp. 13 | First comp. 14 | First comp. 15 | First comp. 16 | First comp. 17 | First comp. 18 | First comp. 19 | First comp. 20 |
|---|---|---|---|---|---|---|---|---|---|---|
| Copolymer A1 | — | — | — | — | — | — | — | — | — | — |
| Copolymer B1 | 100 | 100 | 100 | 100 | 100 | 100 | 100 | 100 | 100 | 100 |
| Copolymer B2 | — | — | — | — | — | — | — | — | — | — |
| Copolymer B3 | — | — | — | — | — | — | — | — | — | — |
| Copolymer B4 | — | — | — | — | — | — | — | — | — | — |
| Copolymer C1 | — | — | — | — | — | — | — | — | — | — |
| Copolymer C2 | — | — | — | — | — | — | — | — | — | — |
| Copolymer C3 | — | — | — | — | — | — | — | — | — | — |
| Copolymer D1 | — | — | — | — | — | — | — | — | — | — |
| Non-fluorinated elastic polymer A | — | — | — | — | — | — | — | — | — | — |
| Crosslinking agent A | — | — | — | — | — | — | — | 1.0 | 1.0 | 1.0 |
| Crosslinking agent B | 13 | 1.5 | 1.5 | 1.5 | 1.5 | 1.5 | 1.5 | 1.5 | — | — |
| Crosslinking agent C | — | — | — | — | — | — | — | — | — | — |
| Crosslinking agent D | — | — | — | — | — | — | — | — | — | — |
| Crosslinking aid A | 5.0 | 5.0 | 5.0 | 5.0 | 5.0 | 5.0 | 5.0 | 5.0 | 5.0 | 5.0 |
| Crosslinking aid B | — | — | — | — | — | — | — | — | — | — |
| Crosslinking aid C | — | — | — | — | — | — | — | — | — | — |
| Antioxidant | 1.46 | 1.00 | 1.10 | 1.67 | 0.89 | 0.10 | 0.21 | — | 0.30 | 0.42 |
| Carbon black A | 30 | 30 | 30 | 30 | 30 | 30 | 30 | 30 | 30 | 30 |
| Carbon black B | — | — | — | — | — | — | — | — | — | — |
| Processing aid A | 1.0 | 1.0 | 1.0 | 1.0 | 1.0 | 1.0 | 1.0 | 1.0 | 1.0 | 1.0 |
| Processing aid C | 2 | 2 | 2 | 2 | 2 | 2 | 2 | 2 | 2 | 2 |
| Processing aid F | — | — | — | — | — | — | — | — | — | — |
| Filler A | — | — | — | — | — | — | — | — | — | — |
| RPA conditions | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min |
| Degree of crosslinking MH-ML | 21.66 | 26.57 | 24.63 | 19.46 | 27.08 | 33.00 | 32.42 | 29.05 | 24.08 | 20.97 |
| $t_{90.4}$ [min] | 11.4 | 9.87 | 9.91 | 11.77 | 8.77 | 4.45 | 4.45 | 8.84 | 11.81 | 12.13 |
| $t_{2.4}$ [min] | 1.17 | 0.97 | 0.01 | 1.26 | 0.92 | 0.72 | 0.72 | 1.01 | 1.22 | 1.35 |
| SP value | 8.8 | 8.8 | 8.8 | 8.8 | 8.8 | 8.8 | 8.8 | 8.8 | 8.8 | 8.8 | comp.: composition

TABLE 1-3

|  | First comp. 21 | First comp. 22 | First comp. 23 | First comp. 24 | First comp. 25 | First comp. 26 | First comp. 27 | First comp. 28 | First comp. 29 | First comp. 30 |
|---|---|---|---|---|---|---|---|---|---|---|
| Copolymer A1 | — | — | — | — | — | — | — | — | — | — |
| Copolymer B1 | 100 | 100 | 100 | — | — | — | — | — | — | — |
| Copolymer B2 | — | — | — | — | — | — | — | — | 100 | — |
| Copolymer B3 | — | — | — | — | — | — | — | — | — | 100 |
| Copolymer B4 | — | — | — | 100 | 100 | 100 | 100 | — | — | — |
| Copolymer C1 | — | — | — | — | — | — | — | — | — | — |
| Copolymer C2 | — | — | — | — | — | — | — | — | — | — |
| Copolymer C3 | — | — | — | — | — | — | — | — | — | — |
| Copolymer D1 | — | — | — | — | — | — | — | 100 | — | — |
| Non-fluorinated elastic polymer A | — | — | — | — | — | — | — | — | — | — |

TABLE 1-3-continued

|  | First comp. 21 | First comp. 22 | First comp. 23 | First comp. 24 | First comp. 25 | First comp. 26 | First comp. 27 | First comp. 28 | First comp. 29 | First comp. 30 |
|---|---|---|---|---|---|---|---|---|---|---|
| Crosslinking agent A | 1.0 | — | 1.0 | — | — | — | — | — | — | — |
| Crosslinking agent B | — | — | — | 1.0 | 0.5 | 2.0 | 1.0 | — | 1.5 | 1.5 |
| Crosslinking agent C | — | 1.0 | — | — | — | — | — | — | — | — |
| Crosslinking agent D | — | — | — | — | — | — | — | 1.0 | — | — |
| Crosslinking aid A | 5.0 | 5.0 | 5.0 | 3.0 | 3.0 | 3.0 | 3.0 | — | 5.0 | 5.0 |
| Crosslinking aid B | — | — | — | — | — | — | — | — | — | — |
| Crosslinking aid C | — | — | — | — | — | — | — | 5.0 | — | — |
| Antioxidant | 0.06 | — | — | — | — | — | 1.00 | 1.50 | 1.00 | 1.00 |
| Carbon black A | 30 | 30 | — | 30 | 30 | 30 | 30 | 30 | 30 | 30 |
| Carbon black B | — | — | 15 | — | — | — | — | — | — | — |
| Processing aid A | 1.0 | 1.0 | 1.0 | 1.0 | 1.0 | 1.0 | 1.0 | 1.0 | 1.0 | 1.0 |
| Processing aid C | 2 | 2 | 2 | — | — | — | — | — | 2 | 2 |
| Processing aid F | — | — | — | — | — | — | — | — | — | — |
| Filler A | — | — | — | — | — | — | — | — | — | — |
| RPA conditions | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min |
| Degree of crosslinking MH-ML | 27.44 | 24.58 | 27.59 | 72.1 | 70.14 | 73.22 | 61.36 | 35.23 | 11.56 | 30.5 |
| $t_{90,4}$ [min] | 10.03 | 10.99 | 10.7 | 3.8 | 6.1 | 2.5 | 8.72 | 8.66 | 10.6 | 8.89 |
| $t_{2,4}$ [min] | 1.09 | 1.55 | 1.19 | 0.6 | 0.5 | 0.62 | 0.68 | 0.65 | 0.84 | 0.88 |
| SP value | 8.8 | 8.8 | 8.8 | 8.8 | 8.8 | 8.8 | 8.8 | 8.8 | 8.8 | 8.8 | comp.: composition

TABLE 1-4

|  | First composition 31 | First composition 32 | First composition 33 | First composition 34 | First composition 35 |
|---|---|---|---|---|---|
| Copolymer A1 | — | — | — | — | 100 |
| Copolymer B1 | — | — | — | — | — |
| Copolymer B2 | — | — | — | — | — |
| Copolymer B3 | — | — | — | — | — |
| Copolymer B4 | 100 | — | — | — | — |
| Copolymer C1 | — | 100 | — | — | — |
| Copolymer C2 | — | — | 100 | — | — |
| Copolymer C3 | — | — | — | 100 | — |
| Copolymer D1 | — | — | — | — | — |
| Non-fluorinated elastic polymer A | — | — | — | — | — |
| Crosslinking agent A | — | — | — | — | — |
| Crosslinking agent B | 1.5 | — | 1.0 | 1.0 | 1.0 |
| Crosslinking agent C | — | 1.0 | — | — | — |
| Crosslinking agent D | — | — | — | — | — |
| Crosslinking aid A | 5.0 | 3.0 | 3.0 | 3.0 | 5.0 |
| Crosslinking aid B | — | — | — | — | — |
| Crosslinking aid C | — | — | — | — | — |
| Antioxidant | 1.00 | — | 1.00 | 1.00 | — |
| Carbon black A | 30 | 30 | 30 | 30 | 10 |
| Carbon black B | — | — | — | — | — |
| Processing aid A | 1.0 | 1.0 | 1.0 | 1.0 | — |
| Processing aid C | 2 | — | — | — | — |
| Processing aid F | — | — | — | — | 1 |
| Filler A | — | — | — | — | 10 |
| RPA conditions | 170° C. × 20 min | 170° C × 20 min | 170° C. × 20 min | 170° C × 20 min | 170° C. × 12 min |
| Degree of crosslinking MH-ML | 65.33 | 65.56 | 78.89 | 49.56 | 25.57 |
| $t_{90,4}$ [min] | 6.87 | 7.02 | 7.11 | 8.98 | 8.89 |
| $t_{2,4}$ [min] | 0.98 | 1.36 | 0.68 | 0.62 | 1.05 |
| SP value | 8.8 | 8.8 | 8.8 | 8.8 | 8.8 |

<Preparation of Second Composition>

The copolymer and the compounding agents were uniformly kneaded in blend ratios by mass ratio as identified in Tables 2-1 to 2-3 by a twin roll mill to prepare second compositions 1 to 30. MH−ML, $t_{90B}$, $t_{2B}$ and the Mooney viscosity of each composition were measured by the above method. The results are shown in Tables 2-1 to 2-3. In Tables 2-1 to 2-3, "RPA conditions" represents the crosslinking conditions measured by a viscoelasticity measuring machine (manufactured by ALPHA TECHNOLOGIES, RPA-2000). For example, "170° C.×30 min" means that the second composition was crosslinked at 170° C. for 30 minutes.

TABLE 2-1

|  | Second comp. 1 | Second comp. 2 | Second comp. 3 | Second comp. 4 | Second comp. 5 | Second comp. 6 | Second comp. 7 | Second comp. 8 | Second comp. 9 | Second comp. 10 |
|---|---|---|---|---|---|---|---|---|---|---|
| Copolymer A1 | — | — | — | — | — | — | — | — | 10 | — |
| Copolymer B1 | — | — | — | — | — | — | — | — | — | 10 |
| Non-fluorinated elastic polymer A | 100 | 100 | 100 | 100 | 100 | 100 | 100 | 100 | 90 | 90 |
| Non-fluorinated elastic polymer B | — | — | — | — | — | — | — | — | — | — |
| Non-fluorinated elastic polymer C | — | — | — | — | — | — | — | — | — | — |
| Non-fluorinated elastic polymer D | — | — | — | — | — | — | — | — | — | — |
| Non-fluorinated elastic polymer E | — | — | — | — | — | — | — | — | — | — |
| Non-fluorinated elastic polymer F | — | — | — | — | — | — | — | — | — | — |
| Non-fluorinated elastic polymer G | — | — | — | — | — | — | — | — | — | — |
| Crosslinking agent B | 2.0 | 2.0 | 2.0 | 4.0 | 4.0 | 4.0 | 4.0 | 4.0 | 4.0 | 4.0 |
| Crosslinking agent E | — | — | — | — | — | — | — | — | — | — |
| Crosslinking agent F | — | — | — | — | — | — | — | — | — | — |
| Crosslinking agent G | — | — | — | — | — | — | — | — | — | — |
| Crosslinking agent H | — | — | — | — | — | — | — | — | — | — |
| Crosslinking agent I | — | — | — | — | — | — | — | — | — | — |
| Crosslinking aid A | — | — | — | 2.0 | 1.0 | 1.0 | — | — | — | — |
| Crosslinking aid B | 2.0 | 4.4 | 4.7 | — | — | 1.0 | 6.0 | 2.0 | 2.0 | 2.0 |
| Crosslinking aid D | — | — | — | — | — | — | — | — | — | — |
| Carbon black B | 55 | 55 | 55 | — | 55 | 55 | 55 | 55 | 55 | 55 |
| Carbon black C | — | — | — | 45 | — | — | — | — | — | — |
| Carbon black D | — | — | — | — | — | — | — | — | — | — |
| Carbon black E | — | — | — | — | — | — | — | — | — | — |
| Processing aid B | 0.5 | 0.5 | 0.5 | 0.5 | 0.5 | 0.5 | 0.5 | 0.5 | 0.5 | 0.5 |
| Processing aid D | 0.5 | 0.5 | 0.5 | 0.5 | 0.5 | 0.5 | 0.5 | 0.5 | 0.5 | 0.5 |
| Processing aid E | 1.25 | 1.25 | 1.25 | 1.25 | 1.25 | 1.25 | 1.25 | 1.25 | 1.25 | 1.25 |
| Plasticizer | — | — | — | — | — | — | — | — | — | — |
| Antioxidant | 1.0 | 1.0 | 1.0 | 1.0 | 1.0 | 1.0 | 1.0 | 1.0 | 1.0 | 1.0 |
| Filler B | — | — | — | — | — | — | — | — | — | — |
| Crosslinking accelerator A | — | — | — | — | — | — | — | — | — | — |
| Crosslinking accelerator B | — | — | — | — | — | — | — | — | — | — |
| RPA conditions | 170° C. × 30 min | 170° C. × 20 min | 170° C. × 20 min | 170° C. × 20 min | 170° C. × 20 min | 170° C. × 20 min | 170° C. × 30 min | 170° C. × 12 min | 170° C. × 12 min | 170° C. × 12 min |
| Degree of crosslinking MH-ML | 54.18 | 63.59 | 61.65 | 98.93 | 93.59 | 102.08 | 114.05 | 86.7 | 89.68 | 88.24 |
| $t_{90B}$ [min] | 10.67 | 9.5 | 9.7 | 11.12 | 10.63 | 10.13 | 9.44 | 8.34 | 8.25 | 8.22 |
| $t_{2B}$ [min] | 0.8 | 0.71 | 0.72 | 0.95 | 0.87 | 0.56 | 0.5 | 0.54 | 0.55 | 0.52 |
| SP value | 9.3 | 9.3 | 9.3 | 9.3 | 9.3 | 9.3 | 9.3 | 9.3 | 9.3 | 9.3 | comp.: composition

TABLE 2-2

|  | Second comp. 11 | Second comp. 12 | Second comp. 13 | Second comp. 14 | Second comp. 15 | Second comp. 16 | Second comp. 17 | Second comp. 18 | Second comp. 19 | Second comp. 20 |
|---|---|---|---|---|---|---|---|---|---|---|
| Copolymer A1 | — | — | — | — | — | — | — | — | — | — |
| Copolymer B1 | — | — | — | — | — | — | — | — | — | — |

TABLE 2-2-continued

|  | Second comp. 11 | Second comp. 12 | Second comp. 13 | Second comp. 14 | Second comp. 15 | Second comp. 16 | Second comp. 17 | Second comp. 18 | Second comp. 19 | Second comp. 20 |
|---|---|---|---|---|---|---|---|---|---|---|
| Non-fluorinated elastic polymer A | 100 | 100 | 100 | 100 | — | — | — | — | — | — |
| Non-fluorinated elastic polymer B | — | — | — | — | 100 | — | — | — | — | 100 |
| Non-fluorinated elastic polymer C | — | — | — | — | — | 100 | — | — | — | — |
| Non-fluorinated elastic polymer D | — | — | — | — | — | — | 100 | — | — | — |
| Non-fluorinated elastic polymer E | — | — | — | — | — | — | — | 100 | 100 | — |
| Non-fluorinated elastic polymer F | — | — | — | — | — | — | — | — | — | — |
| Non-fluorinated elastic polymer G | — | — | — | — | — | — | — | — | — | — |
| Crosslinking agent B | 2.0 | 4.0 | 2.0 | 2.0 | 4.0 | 4.0 | 4.0 | — | — | 1.0 |
| Crosslinking agent E | — | — | — | — | — | — | — | 0.5 | 0.5 | — |
| Crosslinking agent F | — | — | — | — | — | — | — | — | — | — |
| Crosslinking agent G | — | — | — | — | — | — | — | — | — | 10 |
| Crosslinking agent H | — | — | — | — | — | — | — | — | — | — |
| Crosslinking agent I | — | — | — | — | — | — | — | — | — | 1.25 |
| Crosslinking aid A | 6.0 | 2.0 | — | 2.0 | 2.0 | 2.0 | 2.0 | — | 2.0 | 1.0 |
| Crosslinking aid B | — | — | 6.0 | — | — | — | — | — | — | — |
| Crosslinking aid D | — | — | — | — | — | — | — | — | — | — |
| Carbon black B | 55 | 55 | 55 | 55 | 55 | 55 | 55 | — | — | — |
| Carbon black C | — | — | — | — | — | — | — | — | — | — |
| Carbon black D | — | — | — | — | — | — | — | — | — | — |
| Carbon black E | — | — | — | — | — | — | — | — | — | 60 |
| Processing aid B | 0.5 | 0.5 | 0.5 | 0.5 | 0.5 | 0.5 | 0.5 | — | — | 1.0 |
| Processing aid D | 0.5 | 0.5 | 0.5 | 0.5 | 0.5 | 0.5 | 0.5 | — | — | — |
| Processing aid E | 1.25 | 1.25 | 1.25 | 1.25 | 1.25 | 1.25 | 1.25 | — | — | — |
| Plasticizer | — | — | — | — | — | — | — | — | — | 10 |
| Antioxidant | 1.0 | 1.0 | 1.0 | 1.0 | 1.0 | 1.0 | 1.0 | — | — | — |
| Filler B | — | — | — | — | — | — | — | — | — | — |
| Crosslinking accelerator A | — | — | — | — | — | — | — | — | — | — |
| Crosslinking accelerator B | — | — | — | — | — | — | — | — | — | 4.0 |
| RPA conditions | 170° C. × 12 min | 170° C. × 12 min | 170° C. × 12 min | 170° C. × 30 min | 170° C. × 20 min | 170° C. × 20 min | 170° C. × 20 min | 170° C. × 20 min | 170° C. × 20 min | 170° C. × 20 min |
| Degree of crosslinking MH-ML | 109.93 | 109.75 | 66.1 | 74.22 | 108.55 | 19.47 | 64.19 | 27.12 | 50.86 | 84.9 |
| $t_{90B}$ [min] | 10.15 | 8.76 | 7.6 | 14.97 | 11.58 | 9.6 | 8.85 | 5.15 | 11.53 | 19.89 |
| $t_{2B}$ [min] | 1.43 | 0.91 | 0.66 | 1.45 | 1.27 | 1.94 | 1.03 | 1.42 | 1.57 | 1.55 |
| SP value | 9.3 | 9.3 | 9.3 | 9.3 | 9.3 | 9.8 | 9.5 | 7.3 | 7.3 | 9.3 | comp.: composition

TABLE 2-3

|  | Second comp. 21 | Second comp. 22 | Second comp. 23 | Second comp. 24 | Second comp. 25 | Second comp. 26 | Second comp. 27 | Second comp. 28 | Second comp. 29 | Second comp. 30 |
|---|---|---|---|---|---|---|---|---|---|---|
| Copolymer A1 | — | — | — | — | — | — | — | — | — | — |
| Copolymer B1 | — | — | — | — | — | — | — | — | — | — |
| Non-fluorinated elastic polymer A | — | — | — | — | — | — | — | — | — | — |
| Non-fluorinated elastic polymer B | — | — | — | — | — | — | — | — | — | — |
| Non-fluorinated elastic polymer C | 100 | 100 | 100 | 100 | — | — | — | — | — | — |
| Non-fluorinated elastic polymer D | — | — | — | — | 100 | — | — | — | — | — |
| Non-fluorinated elastic polymer E | — | — | — | — | — | — | — | — | — | — |

TABLE 2-3-continued

| | Second comp. 21 | Second comp. 22 | Second comp. 23 | Second comp. 24 | Second comp. 25 | Second comp. 26 | Second comp. 27 | Second comp. 28 | Second comp. 29 | Second comp. 30 |
|---|---|---|---|---|---|---|---|---|---|---|
| Non-fluorinated elastic polymer F | — | — | — | — | — | — | — | — | 100 | 100 |
| Non-fluorinated elastic polymer G | — | — | — | — | — | 100 | 100 | 100 | — | — |
| Crosslinking agent B | 2.0 | — | — | — | 2.0 | 1.0 | — | — | 3.0 | 2.0 |
| Crosslinking agent E | — | — | — | — | — | — | — | — | — | — |
| Crosslinking agent F | — | 1.0 | — | — | — | — | — | — | — | — |
| Crosslinking agent G | — | — | 1.5 | 1.5 | — | 0.5 | 0.5 | 0.5 | — | — |
| Crosslinking agent H | — | — | — | — | — | 1.5 | 1.5 | 1.5 | — | — |
| Crosslinking agent I | — | — | — | — | — | — | — | — | — | — |
| Crosslinking aid A | 1.0 | 5.0 | 5.0 | 5.0 | 1.0 | 1.0 | — | 1.0 | 2.0 | 1.0 |
| Crosslinking aid B | — | — | — | — | — | — | — | — | — | — |
| Crosslinking aid D | — | — | 5.0 | — | — | — | — | — | — | — |
| Carbon black B | 55 | 50 | 50 | 50 | 55 | 60 | 60 | 60 | 50 | 50 |
| Carbon black C | — | — | — | — | — | — | — | — | — | — |
| Carbon black D | — | — | 50 | 50 | — | — | — | — | — | — |
| Carbon black E | — | — | — | — | — | 60 | 60 | 60 | — | — |
| Processing aid B | 0.5 | 1.0 | 1.0 | 1.0 | 0.5 | 1.0 | 1.0 | 1.0 | 0.5 | 0.5 |
| Processing aid D | 0.5 | — | — | — | 0.5 | — | — | — | — | — |
| Processing aid E | 1.25 | 0.50 | 0.50 | 0.50 | 1.25 | — | — | — | — | — |
| Plasticizer | — | — | — | — | — | 10 | 10 | 10 | — | — |
| Antioxidant | 1.0 | 0.5 | 1.0 | 1.0 | 1.0 | — | — | — | — | — |
| Filler B | — | — | 5.0 | 5.0 | — | — | — | — | — | — |
| Crosslinking accelerator A | — | — | — | — | — | — | — | — | 5.0 | 5.0 |
| Crosslinking accelerator B | — | — | — | — | — | — | — | — | — | — |
| RPA conditions | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min | 170° C. × 20 min |
| Degree of crosslinking MH-ML | 11.48 | 63.11 | 64.06 | 43.25 | 52.12 | 41.00 | 29.37 | 42.21 | 200.32 | 153.4 |
| $t_{90B}$ [min] | 12.7 | 18.21 | 17.26 | 17.66 | 10.54 | 18.78 | 19.02 | 18.56 | 7.44 | 11.62 |
| $t_{2B}$ [min] | 2.22 | 2.78 | 2.56 | 2.88 | 1.35 | 1.23 | 1.33 | 1.55 | 0.4 | 0.48 |
| SP value | 9.8 | 9.8 | 9.8 | 9.8 | 9.5 | 9.5 | 9.5 | 9.5 | 7.9 | 7.9 | comp.: composition

Ex. 1 to 81

Combinations of the first composition and the second composition in Ex. 1 to 81 are shown in Tables 3-1 to 3-3.

The first composition and the second composition in each Ex. were respectively formed into a size of 125 mm×30 mm×1.1 mm in thickness, bonded and preliminarily pressed at 70° C. for 5 minutes. Then, steam vulcanization was carried out at 170° C. for 30 minutes to obtain a laminate in each of Ex. 1 to 81 having a first layer formed of a crosslinked product of the first composition and a second layer formed of a crosslinked product of the second composition, having a size of 120 mm×25 mm×2 mm in thickness. On that occasion, a release film of 60 mm×30 mm was sandwiched between the layer of the first composition and the layer of the second composition so that a half of the laminate in the length direction was a gripping part not bonded.

The absolute value $M_F$ of the crosslinking rate difference between the first composition and the second composition in each Ex. was calculated in accordance with the formula 1.

The gripping part of the laminate in each of Ex. 1 to 49 was set to a T-peel testing machine (JIS K6854-3:1999) and the laminate was subjected to peeling at a rate of 50 mm per minute at a temperature of 150° C., and the peel state between the first layer and the second layer was visually observed to evaluate the interlaminar strength at high temperature, based on standards ⊚: material failure occurred without peeling at the interface, ○: material failure partly occurred with peeling at a part of the interface, and x: peeling occurred at the interface. The evaluation results are shown in Tables 3-1 to 3-3. In the T-peel test, material failure at the peeled surface means favorable interlaminar strength, and peeling at the interface means low interlaminar strength.

TABLE 3-1

| Ex. | First composition | Second composition | Common crosslinking aid | $M_F$ | $t_{2A} - t_{2B}$ | SP value difference | Interlaminar strength at high temperature |
|---|---|---|---|---|---|---|---|
| 1 | Composition 1 | Composition 6 | Crosslinking aid A | 0.03499 | 0.53 | 0.5 | ○ |
| 2 | Composition 1 | Composition 8 | Nil | 0.00081 | 0.55 | 0.5 | ○ |
| 3 | Composition 1 | Composition 9 | Nil | 0.00009 | 0.54 | 0.5 | ⊚ |
| 4 | Composition 1 | Composition 10 | Nil | 0.00009 | 0.57 | 0.5 | ⊚ |
| 5 | Composition 1 | Composition 12 | Crosslinking aid A | 0.00005 | 0.18 | 0.5 | ⊚ |
| 6 | Composition 1 | Composition 16 | Crosslinking aid A | 0.00042 | 0.85 | 1.0 | ⊚ |
| 7 | Composition 2 | Composition 6 | Crosslinking aid A | 0.03388 | 0.42 | 0.5 | ○ |
| 8 | Composition 2 | Composition 12 | Crosslinking aid A | 0.00003 | 0.07 | 0.5 | ⊚ |
| 9 | Composition 7 | Composition 18 | Nil | 0.00572 | 0.73 | 1.5 | ○ |
| 10 | Composition 10 | Composition 13 | Nil | 0.00631 | 0.22 | 0.5 | ○ |
| 11 | Composition 11 | Composition 15 | Crosslinking aid A | 0.000137 | 0.10 | 0.5 | ⊚ |
| 12 | Composition 11 | Composition 19 | Crosslinking aid A | 0.00034 | 0.40 | 1.5 | ⊚ |
| 13 | Composition 12 | Composition 5 | Crosslinking aid A | 0.00752 | 0.10 | 0.5 | ○ |
| 14 | Composition 12 | Composition 6 | Crosslinking aid A | 0.00205 | 0.41 | 0.5 | ○ |
| 15 | Composition 12 | Composition 11 | Crosslinking aid A | 0.00065 | 0.46 | 0.5 | ⊚ |
| 16 | Composition 14 | Composition 15 | Crosslinking aid A | 0.00035 | 0.01 | 0.5 | ⊚ |
| 17 | Composition 15 | Composition 17 | Crosslinking aid A | 0.000039 | 0.11 | 0.7 | ⊚ |
| 18 | Composition 16 | Composition 18 | Nil | 0.00000 | 0.70 | 1.5 | ⊚ |
| 19 | Composition 17 | Composition 18 | Nil | 0.00000 | 0.70 | 1.5 | ⊚ |
| 20 | Composition 18 | Composition 5 | Crosslinking aid A | 0.04521 | 0.14 | 0.5 | ○ |
| 21 | Composition 18 | Composition 6 | Crosslinking aid A | 0.02995 | 0.45 | 0.5 | ○ |
| 22 | Composition 18 | Composition 8 | Nil | 0.00025 | 0.47 | 0.5 | ○ |
| 23 | Composition 18 | Composition 10 | Nil | 0.00134 | 0.49 | 0.5 | ○ |
| 24 | Composition 18 | Composition 12 | Crosslinking aid A | 0.00003 | 0.10 | 0.5 | ⊚ |
| 25 | Composition 18 | Composition 16 | Crosslinking aid A | 0.00215 | 0.93 | 1.0 | ○ |
| 26 | Composition 18 | Composition 17 | Crosslinking aid A | 0.000002 | 0.02 | 0.7 | ⊚ |
| 27 | Composition 19 | Composition 15 | Crosslinking aid A | 0.00059 | 0.05 | 0.5 | ⊚ |
| 28 | Composition 22 | Composition 4 | Crosslinking aid A | 0.00099 | 0.60 | 0.5 | ○ |
| 29 | Composition 22 | Composition 5 | Crosslinking aid A | 0.00125 | 0.68 | 0.5 | ⊚ |
| 30 | Composition 22 | Composition 6 | Crosslinking aid A | 0.00124 | 0.99 | 0.5 | ○ |

TABLE 3-2

| Ex. | First composition | Second composition | Common crosslinking aid | $M_F$ | $t_{2A} - t_{2B}$ | SP value difference | Interlaminar strength at high temperature |
|---|---|---|---|---|---|---|---|
| 31 | Composition 22 | Composition 11 | Crosslinking aid A | 0.00735 | 0.12 | 0.5 | ○ |
| 32 | Composition 22 | Composition 12 | Crosslinking aid A | 0.04785 | 0.64 | 0.5 | ○ |

TABLE 3-2-continued

| Ex. | First composition | Second composition | Common crosslinking aid | $M_F$ | $t_{2A} - t_{2B}$ | SP value difference | Interlaminar strength at high temperature |
|---|---|---|---|---|---|---|---|
| 33 | Composition 22 | Composition 19 | Crosslinking aid A | 0.00299 | 0.02 | 1.5 | ○ |
| 34 | Composition 23 | Composition 1 | Nil | 0.00012 | 0.39 | 0.5 | ○ |
| 35 | Composition 23 | Composition 4 | Crosslinking aid A | 0.00287 | 0.24 | 0.5 | ○ |
| 36 | Composition 23 | Composition 5 | Crosslinking aid A | 0.00019 | 0.32 | 0.5 | ◎ |
| 37 | Composition 23 | Composition 6 | Crosslinking aid A | 0.00038 | 0.63 | 0.5 | ○ |
| 38 | Composition 23 | Composition 11 | Crosslinking aid A | 0.00524 | 0.24 | 0.5 | ○ |
| 39 | Composition 23 | Composition 12 | Crosslinking aid A | 0.04314 | 0.28 | 0.5 | ○ |
| 40 | Composition 27 | Composition 12 | Crosslinking aid A | 0.00012 | 0.23 | 0.5 | ◎ |
| 41 | Composition 27 | Composition 17 | Crosslinking aid A | 0.00045 | 0.35 | 0.7 | ◎ |
| 42 | Composition 28 | Composition 12 | Nil | 0.00025 | 0.26 | 0.5 | ◎ |
| 43 | Composition 28 | Composition 17 | Nil | 0.00058 | 0.38 | 0.7 | ◎ |
| 44 | Composition 3 | Composition 1 | Nil | 1.85985 | 0.20 | 0.5 | X |
| 45 | Composition 3 | Composition 5 | Crosslinking aid A | 1.84136 | 0.27 | 0.5 | X |
| 46 | Composition 3 | Composition 12 | Crosslinking aid A | 1.23148 | 0.31 | 0.5 | X |
| 47 | Composition 6 | Composition 5 | Crosslinking aid A | 0.62650 | 0.13 | 0.5 | X |
| 48 | Composition 29 | Composition 5 | Crosslinking aid A | 0.00000 | 0.03 | 0.5 | ◎ |
| 49 | Composition 30 | Composition 3 | Nil | 0.01762 | 0.16 | 0.5 | ◎ |
| 50 | Composition 30 | Composition 6 | Crosslinking aid A | 0.03240 | 0.32 | 0.5 | ◎ |
| 51 | Composition 30 | Composition 11 | Crosslinking aid A | 0.03317 | 0.55 | 0.5 | ◎ |
| 52 | Composition 30 | Composition 12 | Crosslinking aid A | 0.00139 | 0.03 | 0.5 | ◎ |
| 53 | Composition 29 | Composition 1 | Nil | 0.00008 | 0.04 | 0.5 | ○ |
| 54 | Composition 29 | Composition 4 | Crosslinking aid A | 0.00215 | 0.11 | 0.5 | ○ |
| 55 | Composition 33 | Composition 8 | Nil | 0.04381 | 0.14 | 0.5 | ◎ |
| 56 | Composition 34 | Composition 12 | Crosslinking aid A | 0.00120 | 0.29 | 0.5 | ○ |
| 57 | Composition 14 | Composition 21 | Crosslinking aid A | 0.00025 | 0.96 | 1.0 | ◎ |
| 58 | Composition 19 | Composition 21 | Crosslinking aid A | 0.00088 | 1.00 | 1.0 | ○ |
| 59 | Composition 9 | Composition 25 | Crosslinking aid A | 0.00079 | 0.33 | 0.7 | ○ |
| 60 | Composition 23 | Composition 25 | Crosslinking aid A | 0.00059 | 0.16 | 0.7 | ○ |

TABLE 3-3

| Ex. | First composition | Second composition | Common crosslinking aid | $M_F$ | $t_{2A} - t_{2B}$ | SP value difference | Interlaminar strength at high temperature |
|---|---|---|---|---|---|---|---|
| 61 | Composition 14 | Composition 30 | Crosslinking aid A | 0.00081 | 0.78 | 0.9 | ○ |
| 62 | Composition 19 | Composition 30 | Crosslinking aid A | 0.00089 | 0.74 | 0.9 | ○ |
| 63 | Composition 30 | Composition 4 | Crosslinking aid A | 0.07786 | 0.07 | 0.5 | ◎ |

TABLE 3-3-continued

| Ex. | First composition | Second composition | Common crosslinking aid | $M_F$ | $t_{2A} - t_{2B}$ | SP value difference | Interlaminar strength at high temperature |
|---|---|---|---|---|---|---|---|
| 64 | Composition 30 | Composition 5 | Crosslinking aid A | 0.05354 | 0.01 | 0.5 | ⊚ |
| 65 | Composition 31 | Composition 5 | Crosslinking aid A | 0.28465 | 0.11 | 0.5 | ○ |
| 66 | Composition 31 | Composition 11 | Crosslinking aid A | 0.23372 | 0.45 | 0.5 | ○ |
| 67 | Composition 31 | Composition 12 | Crosslinking aid A | 0.10513 | 0.07 | 0.5 | ○ |
| 68 | Composition 33 | Composition 11 | Crosslinking aid A | 0.17328 | 0.75 | 0.5 | ⊚ |
| 69 | Composition 33 | Composition 12 | Crosslinking aid A | 0.06825 | 0.23 | 0.5 | ⊚ |
| 70 | Composition 32 | Composition 12 | Crosslinking aid A | 0.10879 | 0.23 | 0.5 | ○ |
| 71 | Composition 33 | Composition 4 | Crosslinking aid A | 0.26303 | 0.27 | 0.5 | ○ |
| 72 | Composition 33 | Composition 5 | Crosslinking aid A | 0.21630 | 0.19 | 0.5 | ○ |
| 73 | Composition 30 | Composition 14 | Crosslinking aid A | 0.30935 | 0.57 | 0.5 | X |
| 74 | Composition 24 | Composition 29 | Crosslinking aid A | 0.62045 | 0.20 | 0.9 | X |
| 75 | Composition 1 | Composition 22 | Crosslinking aid A | 0.61512 | 1.69 | 1.0 | X |
| 76 | Composition 35 | Composition 20 | Crosslinking aid A | 0.80328 | 0.50 | 0.5 | X |
| 77 | Composition 35 | Composition 23 | Crosslinking aid A | 0.49821 | 1.51 | 1.0 | X |
| 78 | Composition 35 | Composition 24 | Crosslinking aid A | 0.52525 | 1.83 | 1.0 | X |
| 79 | Composition 35 | Composition 26 | Crosslinking aid A | 0.69795 | 0.18 | 0.7 | X |
| 80 | Composition 35 | Composition 27 | Crosslinking aid A | 0.71945 | 0.28 | 0.7 | X |
| 81 | Composition 35 | Composition 28 | Crosslinking aid A | 0.66493 | 0.50 | 0.7 | X |

The laminate in each of Ex. 1 to 43 and 48 to 72, of which $M_F$ was at most 0.30 and the difference between $t_{2A}$ and $t_{2B}$ was from 0 to 1 [min], was confirmed to have interlaminar strength at high temperature.

In the laminate in each of Ex. 1 to 43 and 48 to 72, in the T-peel test at a temperature of 150° C., peeling did not occur at the interface, and the material failure occurred or peeling occurred at a part of the interface, but material failure partly occurred, and accordingly chemical primary bonding between the first layer and the second layer was confirmed.

Further, the laminate in each of Ex. 1 to 43 and 48 to 72 was subjected to T-peel test at a temperature of 25° C., whereupon peeling did not occur at the interface in each laminate, and the laminate was confirmed to be excellent in interlaminar strength.

In Ex. 44 to 47 and 73 to 81, $M_F$ is larger than 0.30, and accordingly the laminate was confirmed to be inferior in interlaminar strength at high temperature.

INDUSTRIAL APPLICABILITY

The laminate obtained by the process for producing the laminate of the present invention and the laminate of the present invention are suitable for materials of not only a hose but also an O ring, a sheet, a gasket, an oil seal, a diaphragm and a V ring. Further, they are applicable to e.g. a heat resistant chemical resistant sealing material, a heat resistant oil resistant sealing material, an electric wire coating material, a sealing material for a semiconductor device, a corrosion resistant rubber coating material, a sealing material for a urea resistant grease, a rubber coating material, a calendared sheet, a spongy, a rubber roll, an oil drilling member, a radiating sheet, a solution crosslinked product, a rubber spongy bearing seal (such as a urea resistant grease), a lining (chemical resistant), an insulating sheet for an automobile, a packing for an endoscope (amine resistant), a mohno pump, a bellows hose (a processed product of a calendared sheet), a water heater packing or valve, a fender (ocean civil engineering, shipping), fibers and nonwoven fabric (such as protective clothing), a base sealing material, rubber gloves, a button switch, a food container packing and a water bottle packing.

What is claimed is:
1. A process for producing a laminate, comprising
   producing a non-crosslinked laminate having a layer of a first composition containing a fluorinated elastic polymer comprising a copolymer having units based on tetrafluoroethylene and units based on propylene or a copolymer having units based on tetrafluoroethylene and units based on a perfluoro(alkyl vinyl ether), a crosslinking agent and a crosslinking aid, and a layer of a second composition containing a non-fluorinated elastic polymer and a crosslinking agent and optionally a crosslinking aid, and
   crosslinking the first composition and the second composition to produce a laminate having a first layer formed of a crosslinked product of the first composition and a second layer formed of a crosslinked product of the second composition, wherein the absolute value of the crosslinking rate difference between the first composition and the second composition as calculated in accordance with the following formula 1 is at most 0.30:

$$\text{crosslinking rate difference} = [1/(t_{90A}-t_{2A}) - 1/(t_{90B}-t_{2B})] \times (t_{90A}-t_{90B}) \quad \text{formula 1}$$

wherein $t_{2A}$ is a time required until the torque of the first composition starts increasing from the minimum torque, $t_{90A}$ is a time required until the torque of the first composition reaches 90% of the maximum torque, $t_{2B}$ is a time required until the torque of the second composition starts increasing from the minimum torque, and $t_{90B}$ is a time required until the torque of the second composition reaches 90% of the maximum torque, when a crosslinking test is carried out by a Rubber Processing Analyzer (RPA).

2. The process for producing a laminate according to claim 1, wherein the first composition and the second composition contain a common crosslinking aid.

3. The process for producing a laminate according to claim 2, wherein the absolute value of the crosslinking rate difference is at most 0.05.

4. The process for producing a laminate according to claim 1, wherein the first composition and the second composition do not contain a common crosslinking aid, and the absolute value of the crosslinking rate difference is at most 0.02.

5. The process for producing a laminate according to claim 4, wherein the absolute value of the crosslinking rate difference is at most 0.01.

6. The process for producing a laminate according to claim 1, wherein the absolute value of the difference between $t_{2A}$ and $t_{2B}$ is from 0 to 1.0 [min].

7. The process for producing a laminate according to claim 1, wherein the absolute value of the difference between the SP value of the fluorinated elastic polymer contained in the first composition and the SP value of the non-fluorinated elastic polymer contained in the second composition, as calculated in accordance with the following formula 2, is from 0 to 3.0 $[\text{cal/cm}^3]^{1/2}$:

$$SP \text{ value} = (\Delta E/V)^{1/2} \quad \text{formula 2}$$

wherein V is the molar volume of the solvent, and $\Delta E$ is the cohesive energy (energy of latent heat of vaporization).

8. The process for producing a laminate according to claim 1, wherein the degree of crosslinking of the first composition is from 5 to 150, and the degree of crosslinking of the second composition is from 5 to 300, as calculated in accordance with the following formula 3:

$$\text{degree of crosslinking} = MH - ML \quad \text{formula 3}$$

wherein MH is the maximum torque, and ML is the minimum torque, when a crosslinking test is carried out by a Rubber Processing Analzyer (RPA).

9. The process for producing a laminate according to claim 1, wherein the Mooney viscosity of the fluorinated elastic polymer contained in the first composition is from 10 to 300, and the Mooney viscosity of the non-fluorinated elastic polymer contained in the second composition is from 5 to 120.

10. The process for producing a laminate according to claim 1, wherein at least one of the first composition and the second composition contains an antioxidant.

11. The process for producing a laminate according to claim 1, wherein the crosslinking agent in the first composition and the crosslinking agent in the second composition are both organic peroxides.

12. A laminate comprising a first layer formed of a crosslinked product of a first composition containing a fluorinated elastic polymer comprising a copolymer having units based on tetrafluoroethylene and units based on propylene or a copolymer having units based on tetrafluoroethylene and units based on a perfluoro(alkyl vinyl ether), a crosslinking agent and a crosslinking aid, and a second layer formed of a crosslinked product of a second composition containing a non-fluorinated elastic polymer and a crosslinking agent and optionally a crosslinking aid,
wherein the first layer or the second layer undergoes material failure when T-peel test as specified in HS K6854-3:1999 is carried out at a temperature of from 100 to 200° C.

13. A laminated rubber hose, produced by using a laminate produced by the process for producing a laminate as defined in claim 1.

14. A laminated rubber roll, produced by using a laminate produced by the process for producing a laminate as defined in claim 1.

\* \* \* \* \*